US008638527B2

(12) United States Patent
Franca-Neto et al.

(10) Patent No.: US 8,638,527 B2
(45) Date of Patent: Jan. 28, 2014

(54) SIGNALING METHOD AND APPARATUS FOR WRITE ASSIST OF HIGH COERCIVITY MEDIA USING INTEGRATED HALF COIL

(75) Inventors: Luiz M. Franca-Neto, Sunnyvale, CA (US); Bernhard E. Knigge, San Jose, CA (US); Petrus Antonius Van Der Heijden, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 983 days.

(21) Appl. No.: 12/589,042

(22) Filed: Oct. 16, 2009

(65) Prior Publication Data
US 2011/0090584 A1   Apr. 21, 2011

(51) Int. Cl.
*G11B 5/17* (2006.01)
(52) U.S. Cl.
USPC ............................................ 360/123.05
(58) Field of Classification Search
USPC ............................................ 360/123.05
See application file for complete search history.

(56) References Cited

U.S. PATENT DOCUMENTS

| 3,611,329 | A  | 10/1971 | Lee et al. |
|---|---|---|---|
| 4,317,148 | A  | 2/1982  | Chi |
| 5,587,851 | A  | 12/1996 | Ishii |
| 5,995,329 | A  | 11/1999 | Shiraishi et al. |
| 6,198,335 | B1 | 3/2001  | Pakriswamy |
| 6,219,193 | B1 | 4/2001  | Janz |
| 6,349,009 | B1 | 2/2002  | Dakroub et al. |
| 6,665,136 | B2 | 12/2003 | Clinton et al. |
| 6,717,770 | B1 | 4/2004  | Crawford |
| 6,795,263 | B2 | 9/2004  | Kuroe et al. |
| 6,891,700 | B2 | 5/2005  | Shiraishi et al. |
| 6,992,850 | B2 | 1/2006  | Nishiyama |
| 7,070,716 | B2 | 7/2006  | Lam |

(Continued)

FOREIGN PATENT DOCUMENTS

| JP | 4188404 | 7/1992 |
|---|---|---|
| JP | 5234170 | 9/1993 |
| JP | 6084103 | 3/1994 |

OTHER PUBLICATIONS

Zhu et al., Microwave Assisted Magnetic Recording, IEEE Trans on Magn, vol. 44, No. 1, Jan. 2008, p. 125-131.

*Primary Examiner* — David D Davis
(74) *Attorney, Agent, or Firm* — D'Arcy H. Lorimer; Lorimer Labs

(57) ABSTRACT

A signaling method and apparatus for providing two write assist components for perpendicular thin film heads writing to high coercivity media is disclosed. The two components provided by the present invention include a media writing assist component and a head switching assist component. Circuit wiring configurations and waveforms for driving an auxiliary half coil are disclosed. These include configurations for connecting the auxiliary half coil in parallel with the main data coil, or connecting the auxiliary half coil to the thermal flight control system. Provision for both common mode signals as well as differential mode signals are disclosed. RF sinusoidal waveforms between 1 and 5 GHz have been found suitable for head switching assist functions for either symmetric current feed and common mode current configuration, or asymmetric current feed and differential mode current configuration. RF sinusoidal waveforms between 10 and 50 GHz have been found suitable for media writing assist functions for either asymmetric or symmetric current feed and differential mode configuration. Data derived signals obtained by passing the data pulse train though high pass filtration has been found to provide both head switching assist and media writing assist functionality. Data derived signals can be used with or without the RF signals.

22 Claims, 33 Drawing Sheets

ABS View

(56) References Cited

U.S. PATENT DOCUMENTS

| | | |
|---|---|---|
| 7,072,142 B2 | 7/2006 | Lam |
| 7,092,186 B1 | 8/2006 | Hog |
| 7,212,367 B2 * | 5/2007 | Clinton et al. .................. 360/55 |
| 7,256,955 B2 | 8/2007 | Pokhil et al. |
| 7,394,605 B2 | 7/2008 | Amemiya |
| 2006/0176601 A1 | 8/2006 | Amin et al. |
| 2007/0253106 A1 | 11/2007 | Sato et al. |
| 2008/0112080 A1 | 5/2008 | Lengsfield et al. |
| 2008/0112087 A1 | 5/2008 | Clinton et al. |
| 2008/0151436 A1 | 6/2008 | Sato et al. |
| 2008/0218891 A1 | 9/2008 | Gubbins et al. |

* cited by examiner

SIGNALING METHOD AND APPARATUS FOR WRITE ASSIST OF HIGH COERCIVITY MEDIA USING INTEGRATED HALF COIL

BACKGROUND OF THE INVENTION

1. Field of the Invention

This invention relates to thin film perpendicular magnetic head structures. Specifically, the invention relates to structures for employing secondary half coils to aid in writing signals to high coercivity media.

2. Description of the Related Art

As bit areal densities in magnetic recording continue to progress in an effort to increase the storage capacity of hard disc drives, magnetic transition dimensions and recording head critical features are continuing to shrink. To make the recording medium stable at higher areal bit densities, magnetically harder medium materials having higher coercivity are required. Typically, writing to a harder medium has been achieved by increasing the saturation magnetization of the magnetic material comprising the inductive write head, however the current art is rapidly reaching the limits of known materials in this regard. A further consequence of higher areal densities is a resultant increase in data rates. At very high data writing rates, it becomes increasingly difficult to switch the magnetization of the recording medium using a conventional write field.

One technology proposed to overcome some of the afore mentioned difficulties is the wire amplified magnetic recording head (WAMR), which utilizes a single ampere wire surrounding three sides of a pole tip. Used as the only magnetic field producing element, the ampere wire has the potential to produce higher writing speeds and data rates (due to it's lower inductance) and a better confined cross track profile. Such a device is disclosed by Clinton et al. in, for example, U.S. Pat. Nos. 7,212,367; 7,149,055; 6,665,136; and US Patent Publication 2008/0112087. In the devices disclosed by Clinton et al., the ampere wire is the main coil for writing the data signals to the media. In some embodiments, an RF AC signal is simply added to the data signal being written by the ampere wire to aid in switching the media. One of the main difficulties of using an ampere wire to write data is the very large current densities required to get a large enough field. These high current densities can produce high temperatures in the ampere wire which may lead to unwanted diffusion and electromigration in the wire and pole tip. In an attempt to control temperatures, heat sink structures located at the ABS are employed to cool the wire as well as deliver current to the wire element itself. However, due to the small cross sectional area of the ampere wire element, cooling by conduction out of the wire is of limited utility.

What is needed is improved methods and structures for writing data to high coercivity media.

FIG. 1 (Prior Art), is a partial cross section view 100 of a typical perpendicular thin film head having a conventional coil. The head comprises shield layers 102, 104; read element 103; shaping layer 110; coil structure 108; main pole 112; lower return pole layer 106; shield 114; filler layer 118; and upper return pole layer 116. Structure 114 may be a trailing shield or wrap around shield. Details of wrap around shields and trailing shields, as applied to perpendicular recording heads, can be found in, for example, US Patent Application Publications 2007/0146930, 2007/0115584, 2006/0174474, 2006/0044682, and 2007/0137027.

FIG. 2 (Prior Art), is a simplified ABS (air bearing surface) view 200 of a WAMR head. In this head structure, ampere wire 204 surrounds three sides of main pole 112 (the pole tip), and is fed write current via conductive element 202, which also serves as a heat sink for heat generated by the ampere wire 204. The ampere wire must have a small cross sectional area to minimize the separation of the pole 112 from the shield elements 114, 115a, and 115b. The low inductance of the ampere wire 204 combined with the small cross sectional area results in very high current densities at fields strong enough to write to high coercivity media. These high currents can create locally high temperatures, particularly in the ampere wire section above the pole tip furthest from the heat sink connections. These high temperatures are undesirable as they induce electromigration and diffusion of components in and surrounding the ampere wire.

FIG. 3 (Prior Art) is a partial cross section view 300 of a WAMR head. In this structure the conventional coil 108 of FIG. 1 has been replaced with the ampere wire 204 and heat sink/conductors 202.

SUMMARY OF THE INVENTION

It is an object of the present invention to provide a method for writing data signals with a perpendicular head to storage media including providing a perpendicular head having a pole layer having a flare point, a main coil, and an auxiliary half coil extending around three sides of the pole layer at the air bearing surface. The auxiliary half coil has a first terminating end and a second terminating end. A first conductive element coupled to the first terminating end extends from the air bearing surface, approximately perpendicular to the air bearing surface, to beyond the flare point of the pole layer. A second conductive element coupled to the second terminating end of the auxiliary half coil, extends from the air bearing surface, approximately perpendicular to the air bearing surface, to beyond the flare point of the pole layer. The method further includes providing a data signal current to the main coil, and providing a differential high frequency signal current, flowing through the first conductive element, the second conductive element, and the auxiliary half coil.

BRIEF DESCRIPTION OF THE DRAWINGS

The present invention will be better understood when consideration is given to the following detailed description thereof. Such description makes reference to the annexed drawings, wherein.

DETAILED DESCRIPTION OF THE PREFERRED EMBODIMENTS

Figure 1:
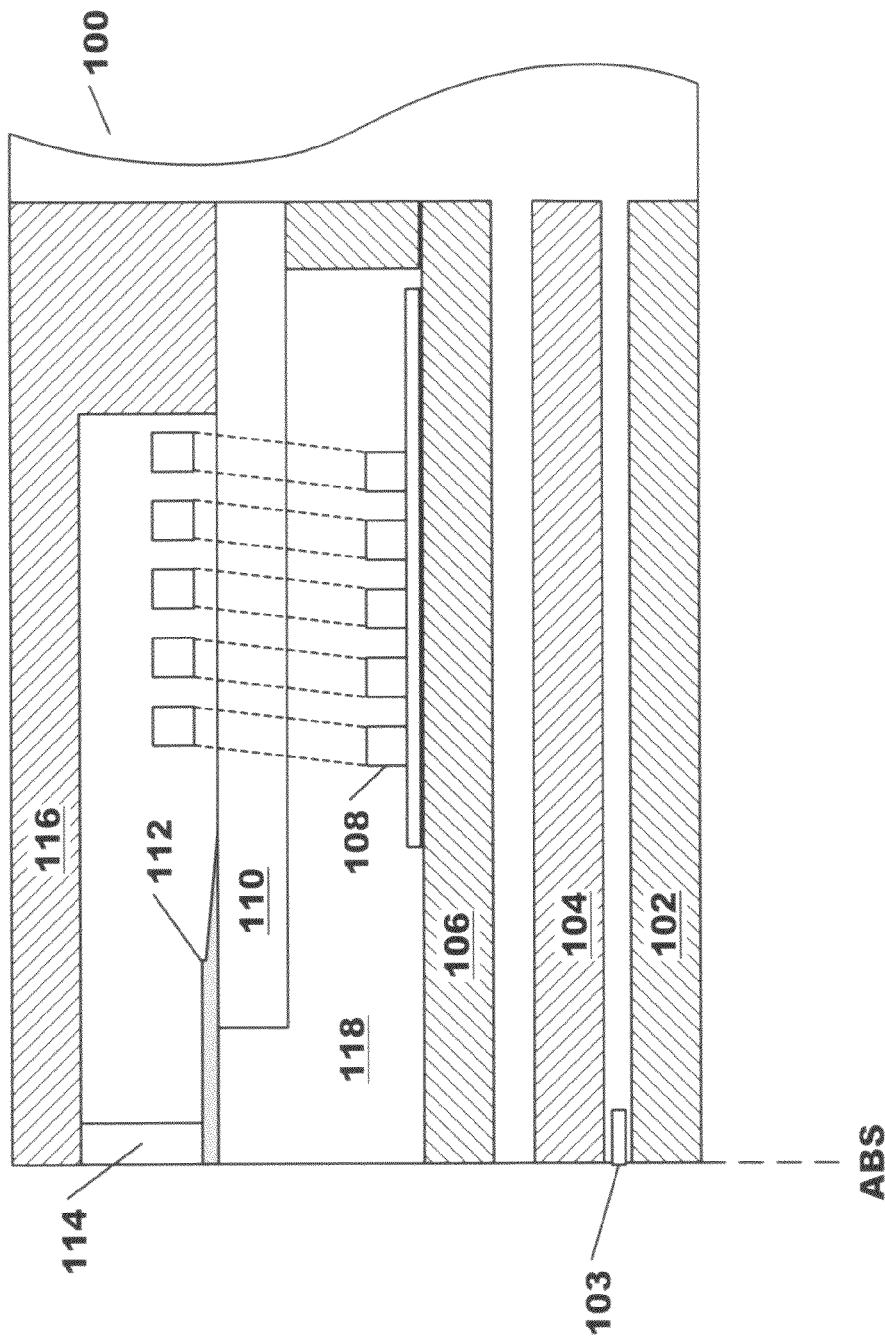
FIG. 1 (Prior Art), is a partial cross section view of a typical perpendicular thin film head having a conventional coil.
Figure 2:
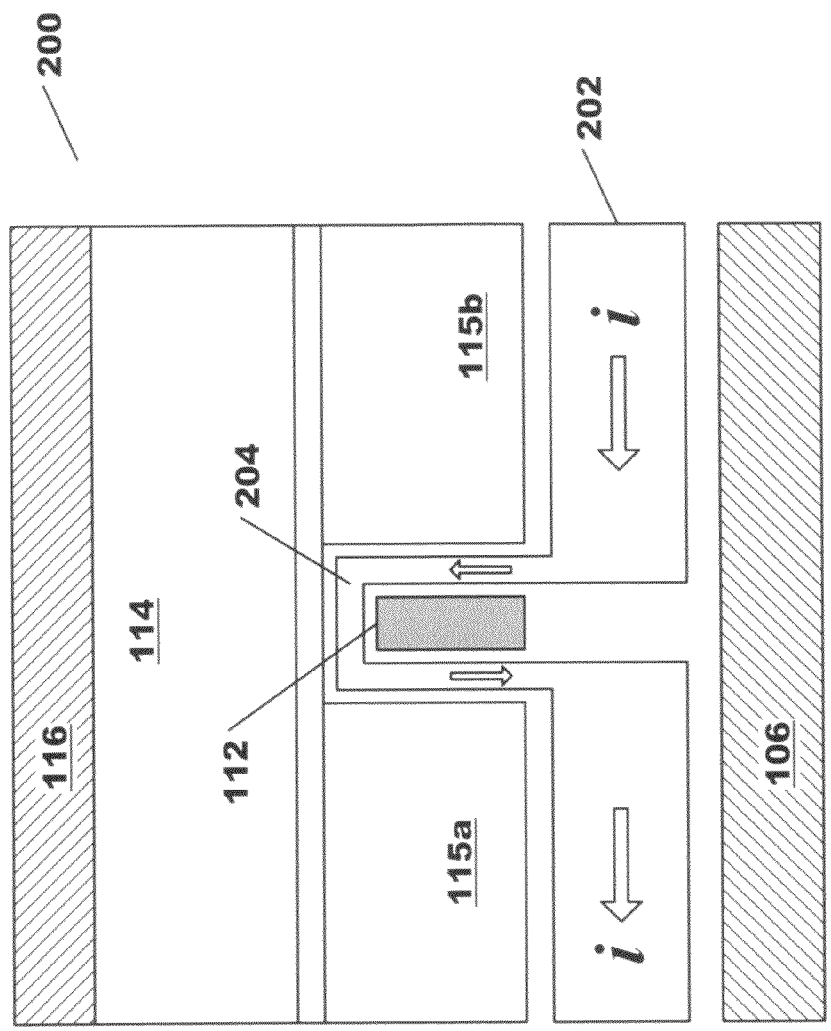
FIG. 2 (Prior Art), is a simplified ABS (air bearing surface) view of a WAMR head.
Figure 3:
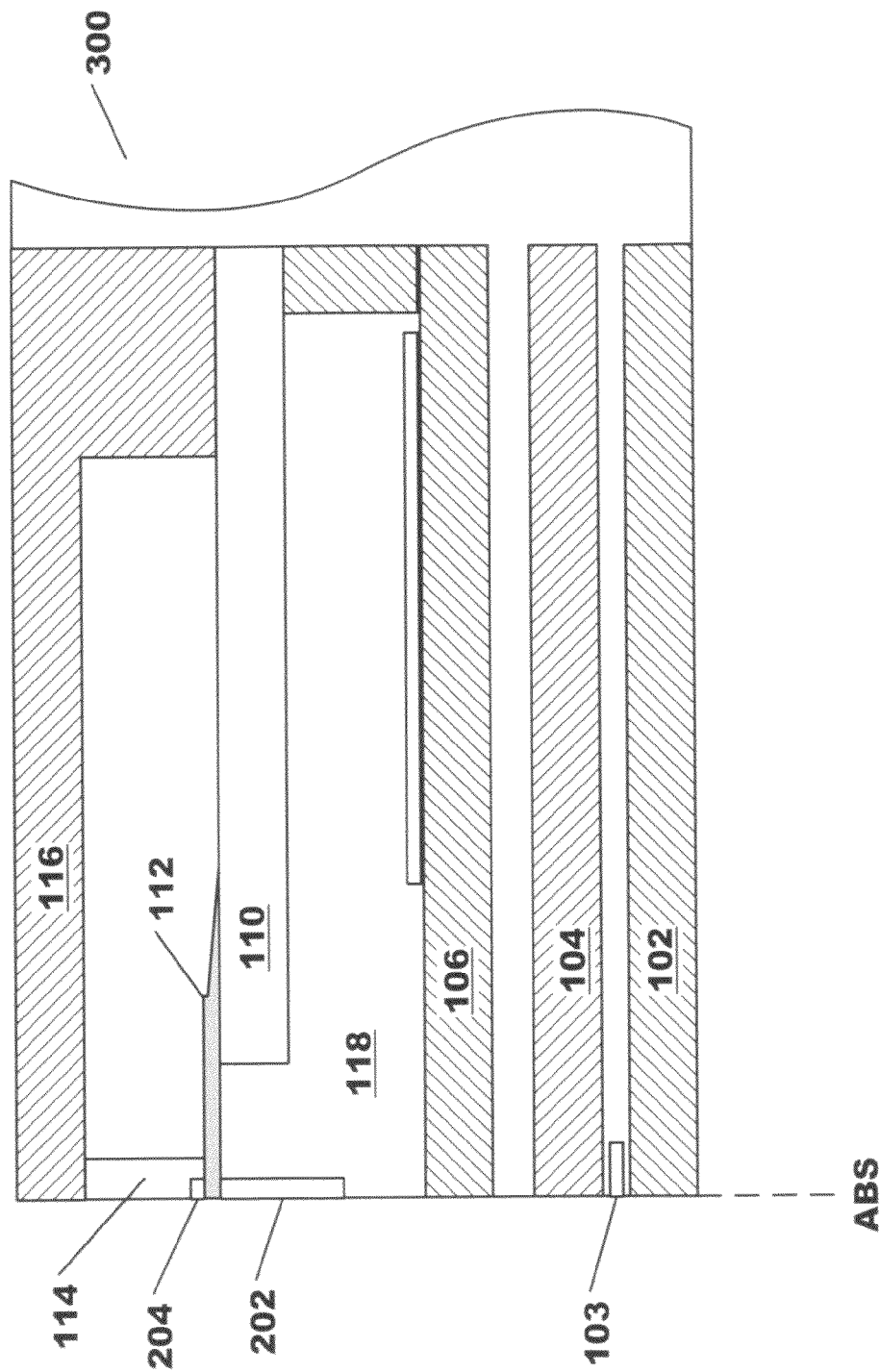
FIG. 3 (Prior Art) is a partial cross section view 300 of a WAMR head.

FIGS. 1-3 (Prior Art) have been discussed above.

The present invention serves to improve upon the previously disclosed WAMR head configurations in a number of ways. Firstly, the present invention utilizes a conventional main coil structure (as in 108 of FIG. 1) in combination with an auxiliary half coil. This significantly reduces the current density in the half coil, which reduces heat sinking requirements, lowers temperatures, and reduces or prevents damaging electromigration and diffusion effects at the half coil. Further, the present invention adds conductive elements that run parallel to the pole layers to add a head switching assist function to the half coil. The half coil serves to introduce RF signals or data-derived special signals which are utilized to both aid in writing to the media and improve switching of the head. The half coil may be connected in parallel with the conventional main coil or may be connected to a separate circuit.

Figure 4:
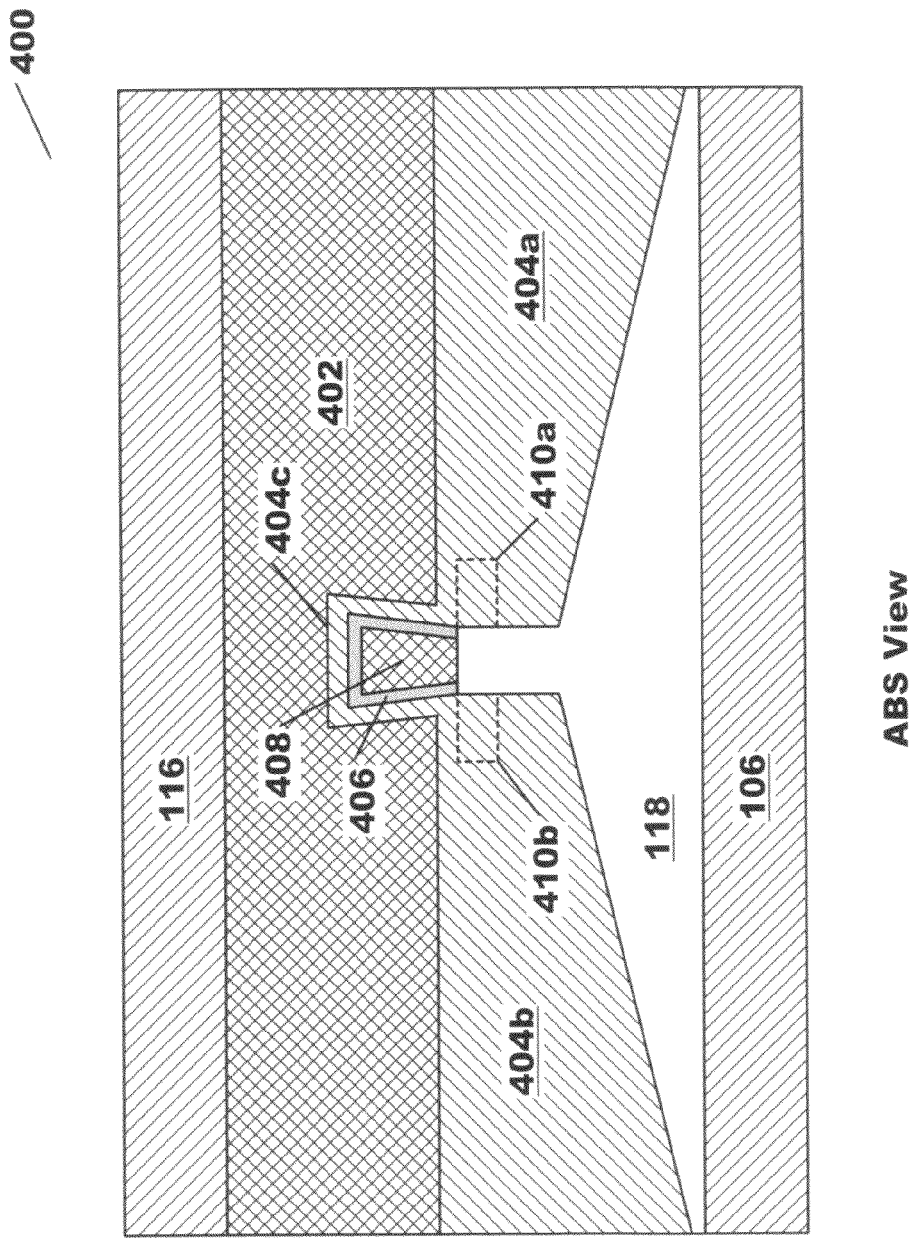
FIG. 4 is an ABS view of an auxiliary half coil having heat sinks at the ABS, in accordance with an embodiment of the present invention.

FIG. 4 is an ABS view 400 of an auxiliary half coil 404c having heat sinks 404a,b at the ABS, in accordance with an embodiment of the present invention. In this view, pole tip 408 is encircled on three sides by half coil 404c. Layer 406 is a low conductivity (relative to the half coil), non magnetic layer that effectively electrically isolates half coil 404c from pole tip 408. Preferably, the heat sink electrical conductivity should be less than about 20% of the half coil, to minimize any parasitic effects. In this embodiment, the half coil 404c is integrally connected to heat sink sections 404a and 404b. Preferably, heat sink sections 404a, 404b and half coil 404c all comprise the same material. Electrical current is delivered to half coil 404c by electrical conductive members 410a and 410b, which are not directly visible in FIG. 4. Note that these conductors reside below the plane upon which the pole layer is deposited. Wrap around shield 402 surrounds the half coil 404c. An insulating layer (not shown) may also be used between half coil 404c and shield 402 if desired. Since half coil 404c is placed between the pole 406 and the shield 402, it increases the effective gap, and therefore should be kept as thin as possible. Increasing the gap reduces the effectiveness of the shield. However, thinner half coils will be limited to lower total current flows to keep resistive heating at high current densities in check. For this reason, a single coil WAMR implementation having very high currents may not be practical for perpendicular heads with wrap around shields. In the present invention, current flows can be kept low since the half coil is an auxiliary coil, and does not carry the burden of writing data to the media.

In the embodiment of FIG. 4, heat sink sections 404a,b, conductor elements 410a,b, and half coil 404c are made of non-magnetic metals, preferably low conductivity metals, such as precious metals or copper, that are stable and not prone to corrosion during manufacturing or operation of the half coil. Pole 406 and shield 402 are comprised of the appropriate magnetic alloys, as are known to those skilled in the art. Layer 406 may be comprised of an insulator such as alumina, silicon dioxide, or any other similar material as is known in the art.

Figure 5:
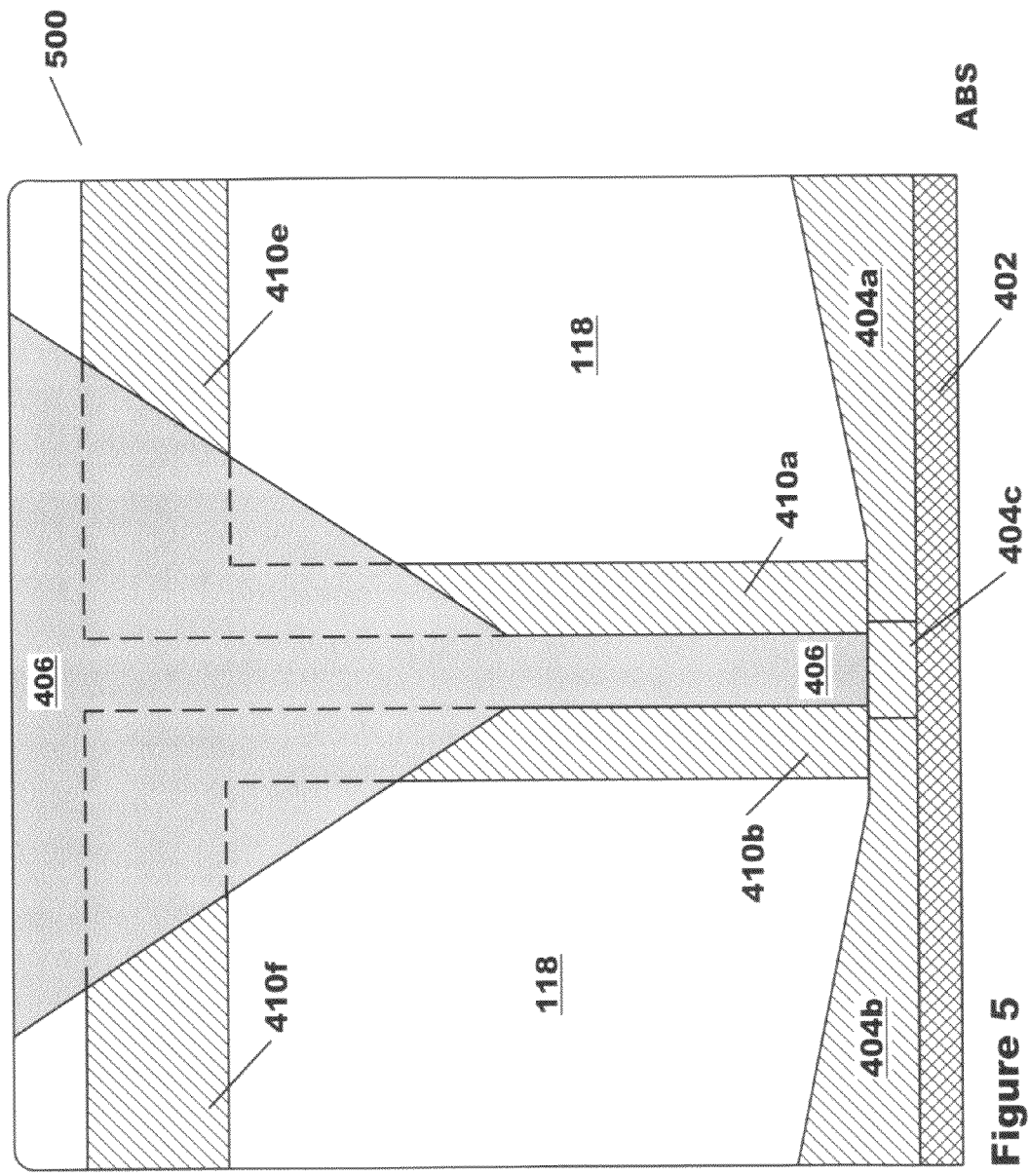
FIG. 5 is a partial plan view of the structure disclosed in FIG. 4, in accordance with an embodiment of the present invention.

FIG. 5 is a partial plan view 500 of the structure disclosed in FIG. 4, in accordance with an embodiment of the present invention. Note that this is a plan view of the structure of FIG. 4 with layer 116 and any filler layers above insulating layer 406 (such as portions of filler layer 118) removed. Conductive elements 410e, 410a, 410b, and 410f deliver electrical current to half coil 404c. Conductive elements 410a and 410b are deliberately placed to run parallel to the pole (under layer 406), past the "flare point" where the pole begins to increase in width. As is shown in FIG. 4, these conductors are also below the base plane of the pole layer. The purpose of this geometry is to provide an additional writing assist function via the auxiliary half coil. If an appropriate common mode RF current or data-derived signal current is produced in both conductors 410a and 410b, an in-plane horizontal magnetic field is induced at the pole tip, which provides a head switching assist function that further improves writing data to the media. Please see the discussion of FIGS. 20-22 for further explanation. For future reference, this geometry (having the current feed conductors symmetrically located with respect to the pole) shall be referred to as "symmetric feed".

If an appropriate differential mode RF current is produced in conductors 410a and 410b, flowing through half coil 404c, a media writing assist function is produced that also improves writing data to the media. Please see the discussion of FIGS. 20-22 for further explanation. It is an advantage of the present invention that both the head switching assist function and the media writing assist function can be utilized together and are complementary.

The embodiments of FIGS. 4 and 5 have a number of advantages over the prior art. In prior art WAMR heads, current flows through the heat sink sections (i.e. 202 in FIG. 2) through the half coil, and conductors 410 are absent. So there is no head switching assist field generated because there is no current flow parallel to the pole. These embodiments of the present invention maintain the utility of a heat sink mounted at the ABS. Heat is transferred to the heat sinks 404a,b by thermal conduction from half coil 404c, as conductors 410a,b provide limited heat conduction from the coil 404c. Heat sinks 404a,b may also provide a conduction path for common mode current to ground via a parasitic capacitance, although they do not carry any differential mode current as in WAMR heads of the prior art. The geometry of the heat sinks may be used by designers to adjust the capacitance coupling effect so that other parameters in the circuitry providing the common mode current can be tuned.

Figure 6:
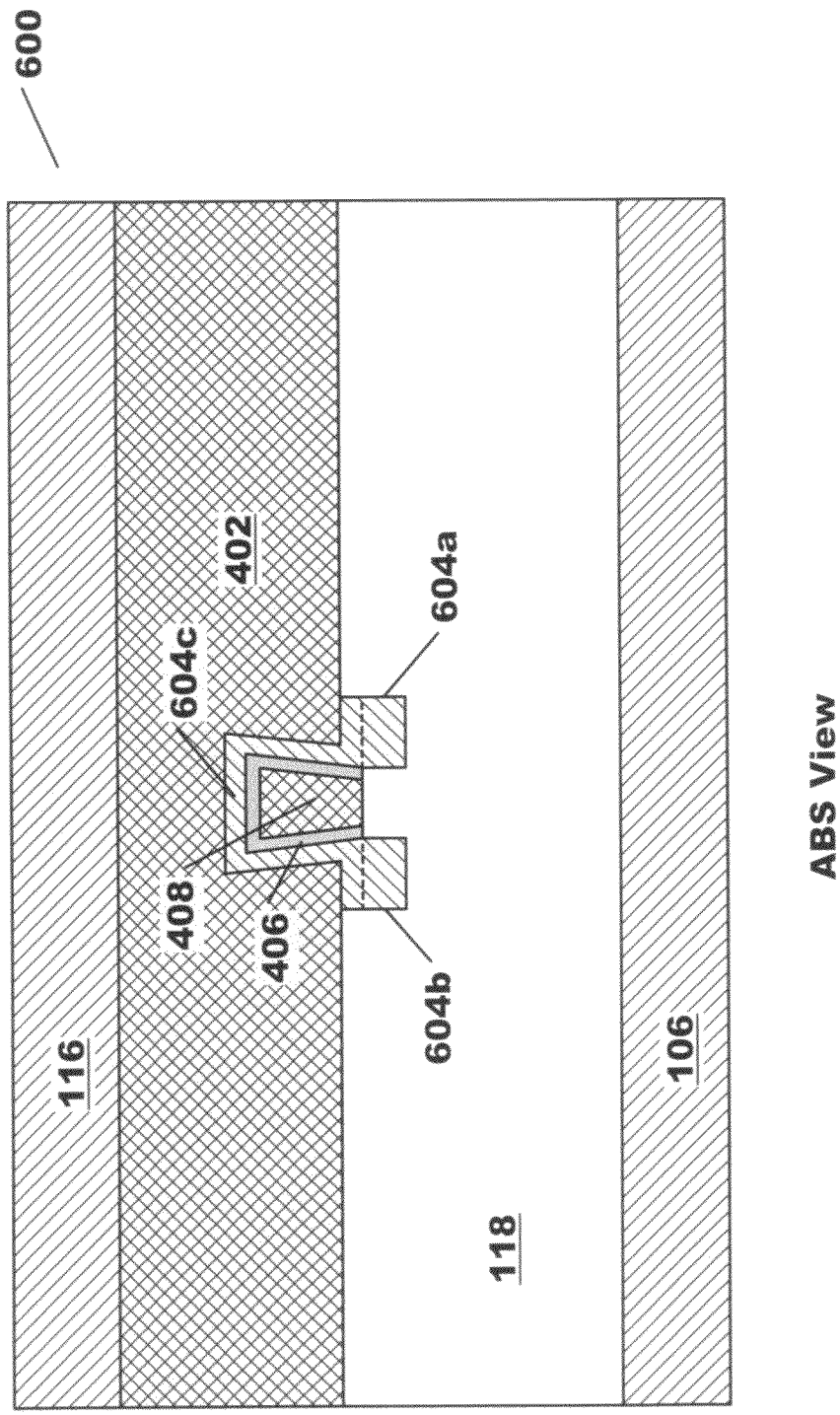
FIG. 6 is an ABS view of an auxiliary half coil having recessed heat sinks, in accordance with an embodiment of the present invention.
Figure 7:
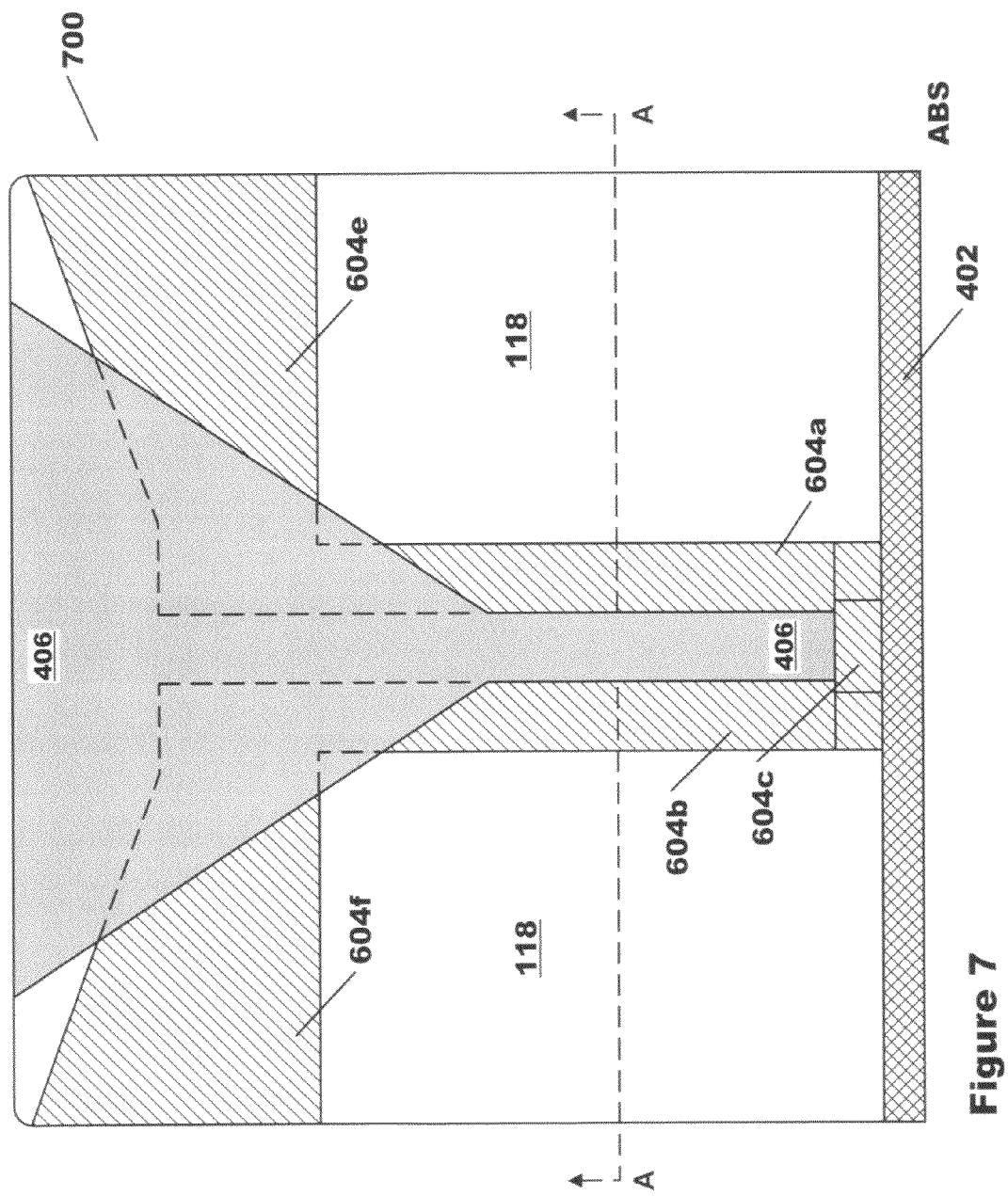
FIG. 7 is a partial plan view of the structure disclosed in FIG. 6, in accordance with an embodiment of the present invention.
Figure 8:
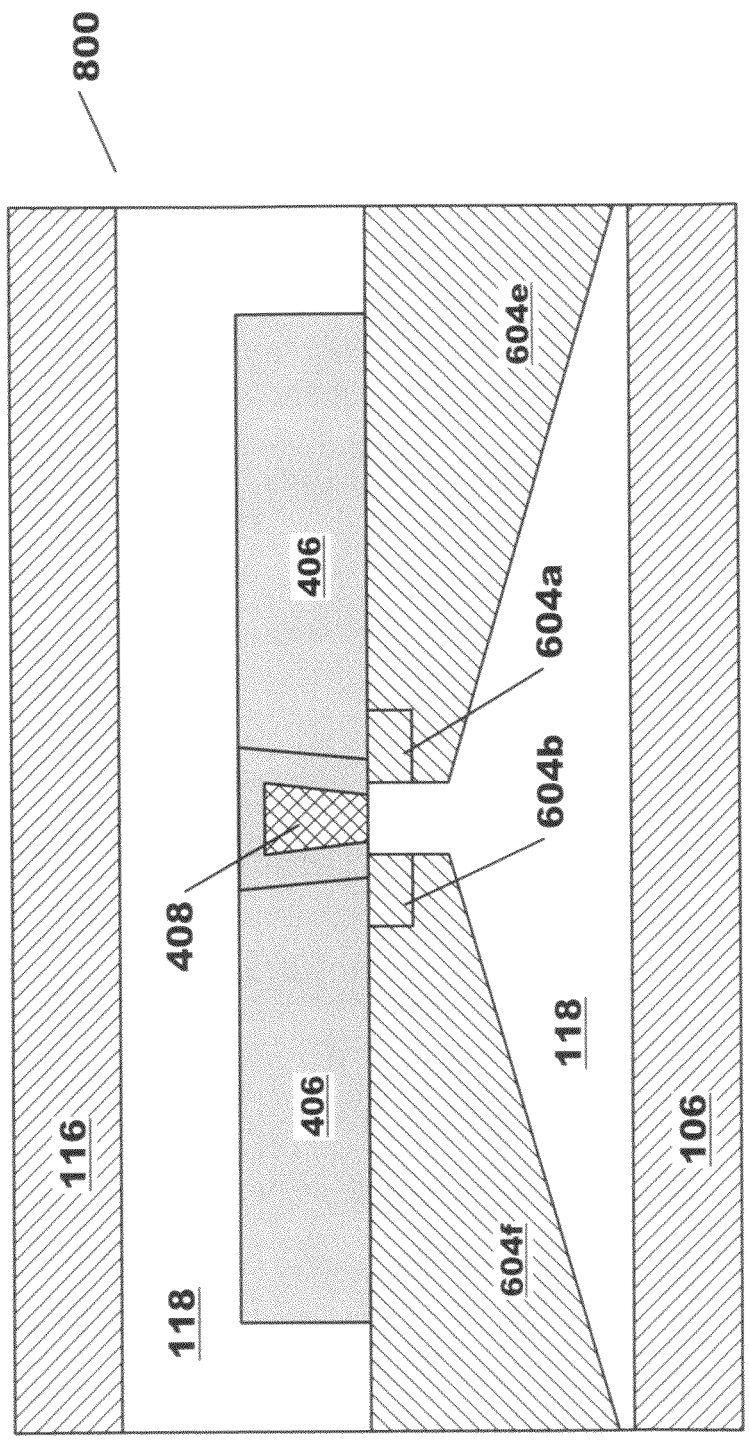
FIG. 8 is a partial cross section view through section A-A in FIG. 7, in accordance with an embodiment of the present invention.

FIG. 6 is an ABS view 600 of an auxiliary half coil 604c having recessed heat sinks 604e,f, in accordance with an embodiment of the present invention. FIG. 7 is a partial plan view 700 of the structure disclosed in FIG. 6. Note that this is a plan view of the structure of FIG. 6 with layer 116 and any filler layers above insulating layer 406 (such as portions of filler layer 118) removed. FIG. 8 is a partial cross section view 800 through section A-A in FIG. 7. Portions of filler layer 118 are transparent to clarify details. In this embodiment of the present invention, the heat sinks 604e and 604f have been recessed from the ABS, beyond the flare point of the pole (under layer 406). Conductive members 604a and 604b serve the dual purpose of conducting heat generated in half coil 604c, and delivering current to and from the half coil. As in the embodiments of FIGS. 4 and 5, the conductors 604a and 604b are arranged as a symmetric feed configuration, which provides head switching assist with the appropriate common mode current and media writing assist with the appropriate differential mode current. In this embodiment, the heat sinks 604e,f carry both the common mode and differential mode current to half coil 604c via conductors 604a,b. Since conductors 604a,b also provide a heat conduction path to the heat sinks, they will be generally thicker and of greater cross section than those shown in FIGS. 4 and 5 (drawings are not to scale). They may also be constructed of a higher thermal conductivity metal.

Figure 9:
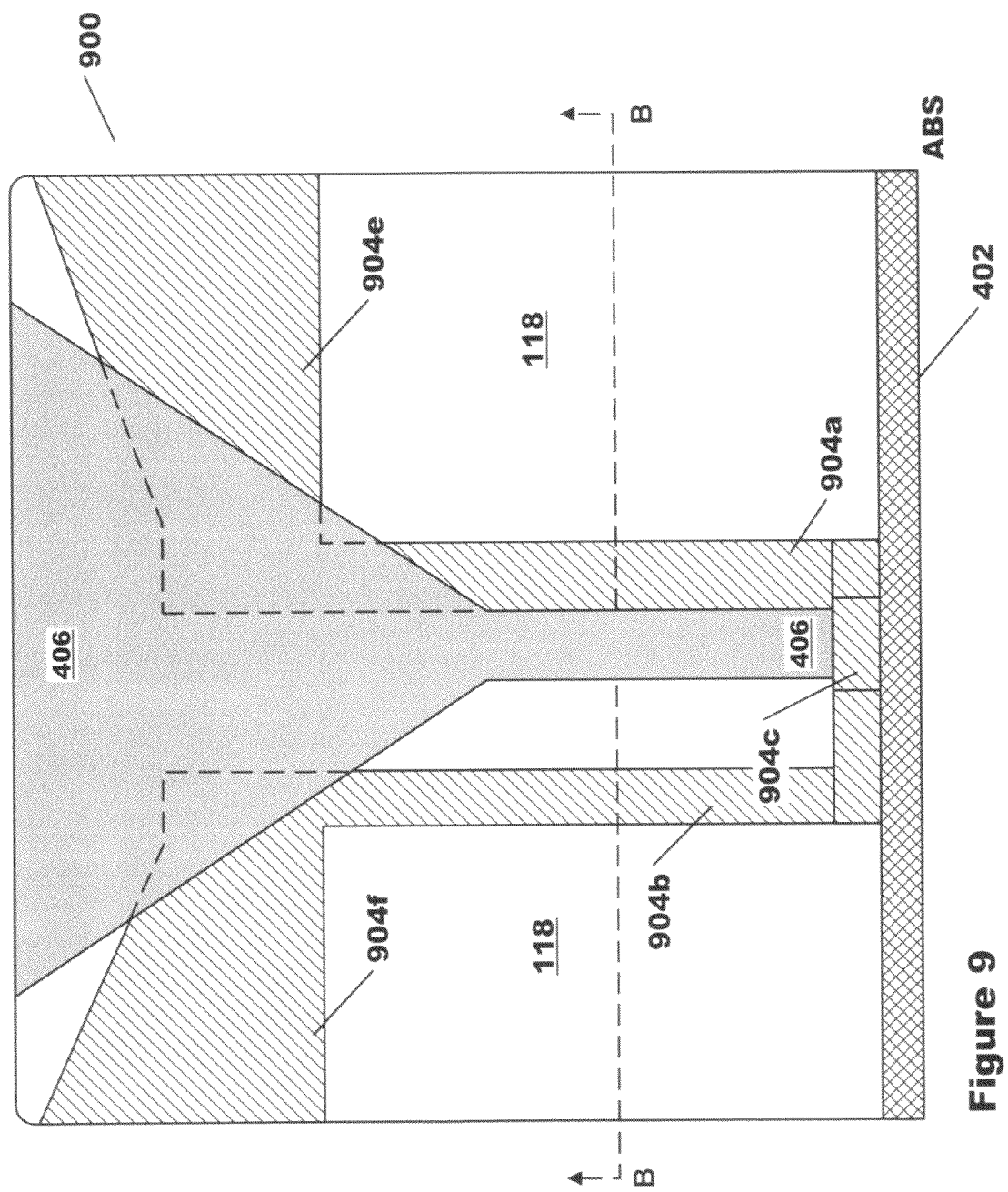
FIG. 9 is a partial plan view of an auxiliary half coil having recessed heat sinks and an asymmetric current feed, in accordance with an embodiment of the present invention.
Figure 10:
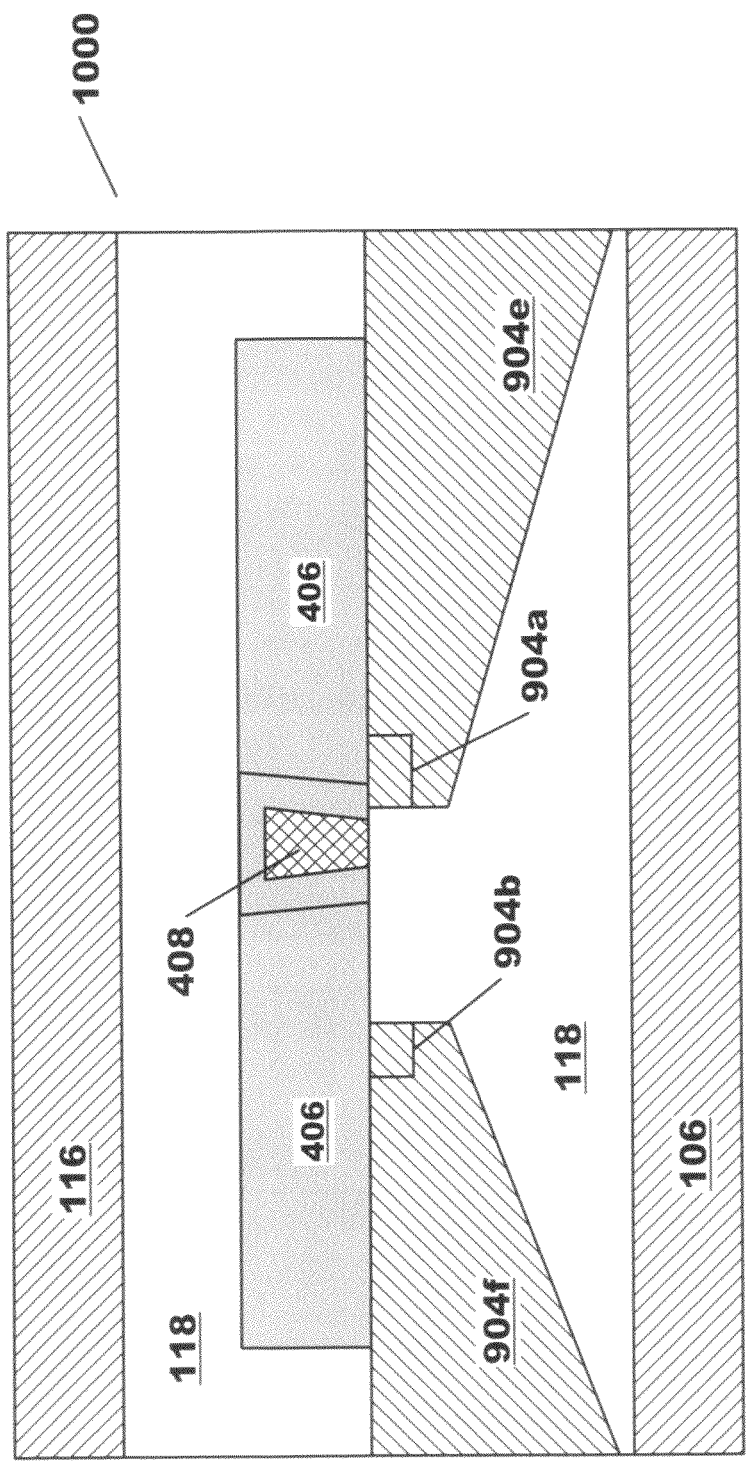
FIG. 10 is a partial cross section view through section B-B in FIG. 9, in accordance with an embodiment of the present invention.
Figure 11:
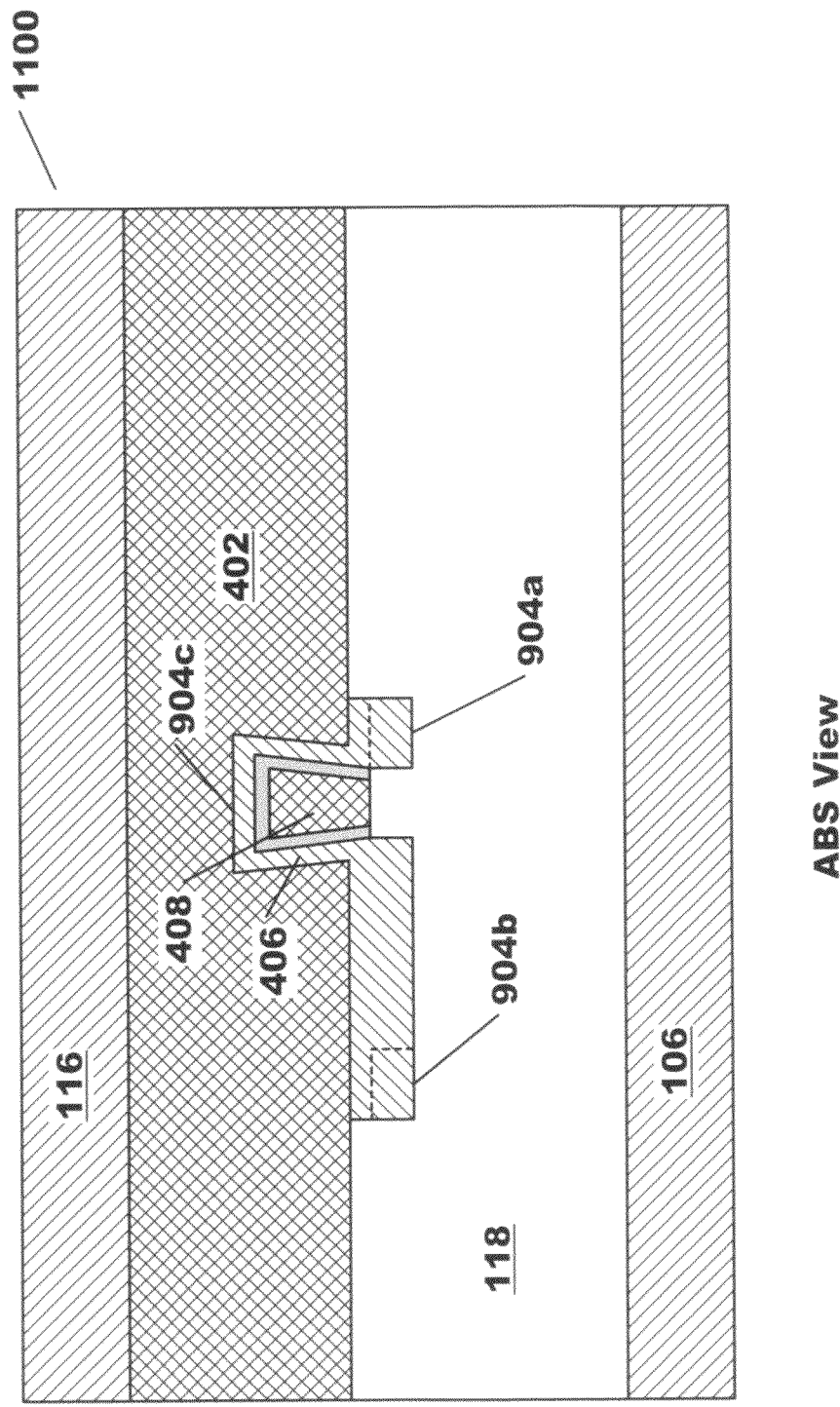
FIG. 11 is an ABS view of the structure of FIGS. 9 and 10, in accordance with an embodiment of the present invention.

FIG. 9 is a partial plan view 900 of an auxiliary half coil 904c having recessed heat sinks 904e,f and an asymmetric current feed, in accordance with an embodiment of the present invention. Note that this is a plan view with layer 116 and any filler layers above insulating layer 406 (such as portions of filler layer 118) removed. FIG. 10 is a partial cross section view through section B-B in FIG. 9. Portions of filler layer 118 are transparent to clarify details. FIG. 11 is an ABS view of the structure of FIGS. 9 and 10. In this embodiment of the present invention, the heat sinks 904e and 904f have been recessed from the ABS, beyond the flare point of the pole (under layer 406). Conductive members 904a and 904b serve the dual purpose of conducting heat generated in half coil 604c, and delivering current to and from the half coil. Unlike the previous embodiments of FIGS. 4-8, conductive members 904a, b are placed asymmetrically with respect to the pole. This is done to allow the use of both common mode and differential mode current flow for head switching assist. In the previous embodiments that utilize symmetric current feed geometries, there is no in-plane (horizontal) component of the magnetic field on the pole tip. To generate an in-plane magnetic field component, one conductor is displaced by an appropriate distance, which allows the horizontal field component from the conductor closest the pole (i.e. 904a) to be present at the pole tip, with a minor impact from the magnetic field gradient from current flowing in the displaced conductor (i.e. 904b). Please refer to FIGS. 20-23 for further explanation. Differential current flow may have some advantages from a circuit design perspective, in that the current is not dependent on parasitic capacitances as in the common mode case. Since the differential current flows from one heat sink, through the auxiliary half coil, to the other heat sink, the conductors can be isolated and grounding effects minimized. In this embodiment, as in previously described embodiments, differential current mode is also utilized for media writing assist.

Figure 12:
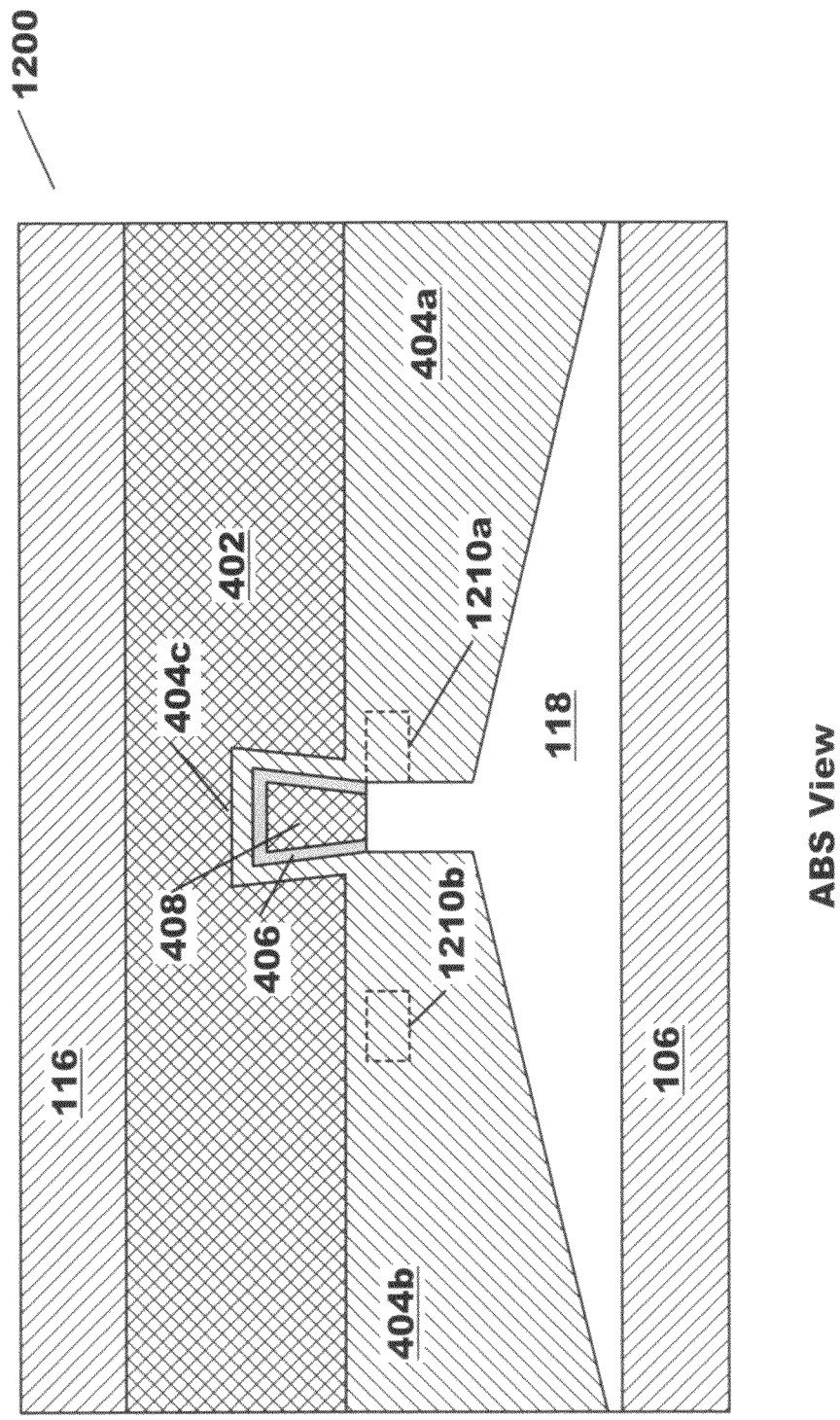
FIG. 12 is an ABS view of an auxiliary half coil having heat sinks at the ABS and an asymmetric current feed, in accordance with an embodiment of the present invention.
Figure 13:
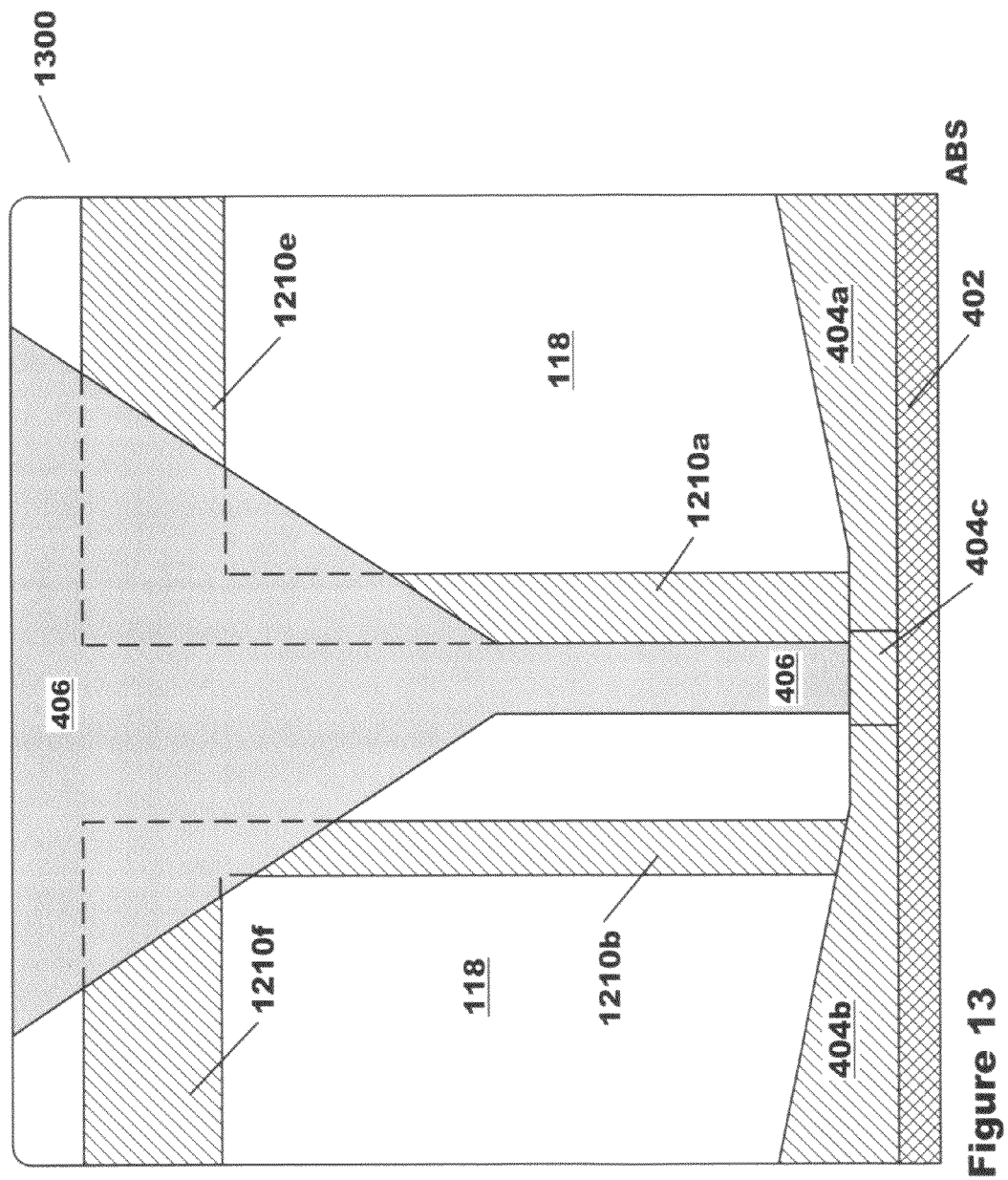
FIG. 13 is a partial plan view of the structure of FIG. 12, in accordance with an embodiment of the present invention.

FIG. 12 is an ABS view 1200 of an auxiliary half coil 404c having heat sinks 404a,b at the ABS and an asymmetric current feed, in accordance with an embodiment of the present invention. FIG. 13 is a partial plan view 1300 of the structure of FIG. 12. This embodiment is similar to the embodiments of FIGS. 4,5, with the exception that the symmetric current feed is replaced by an asymmetric current feed. Differential media writing assist and head switching currents flow through conductors 1210e, 1210a, 1210b, and 1210f to and from auxiliary half coil 404c.

Figure 14:
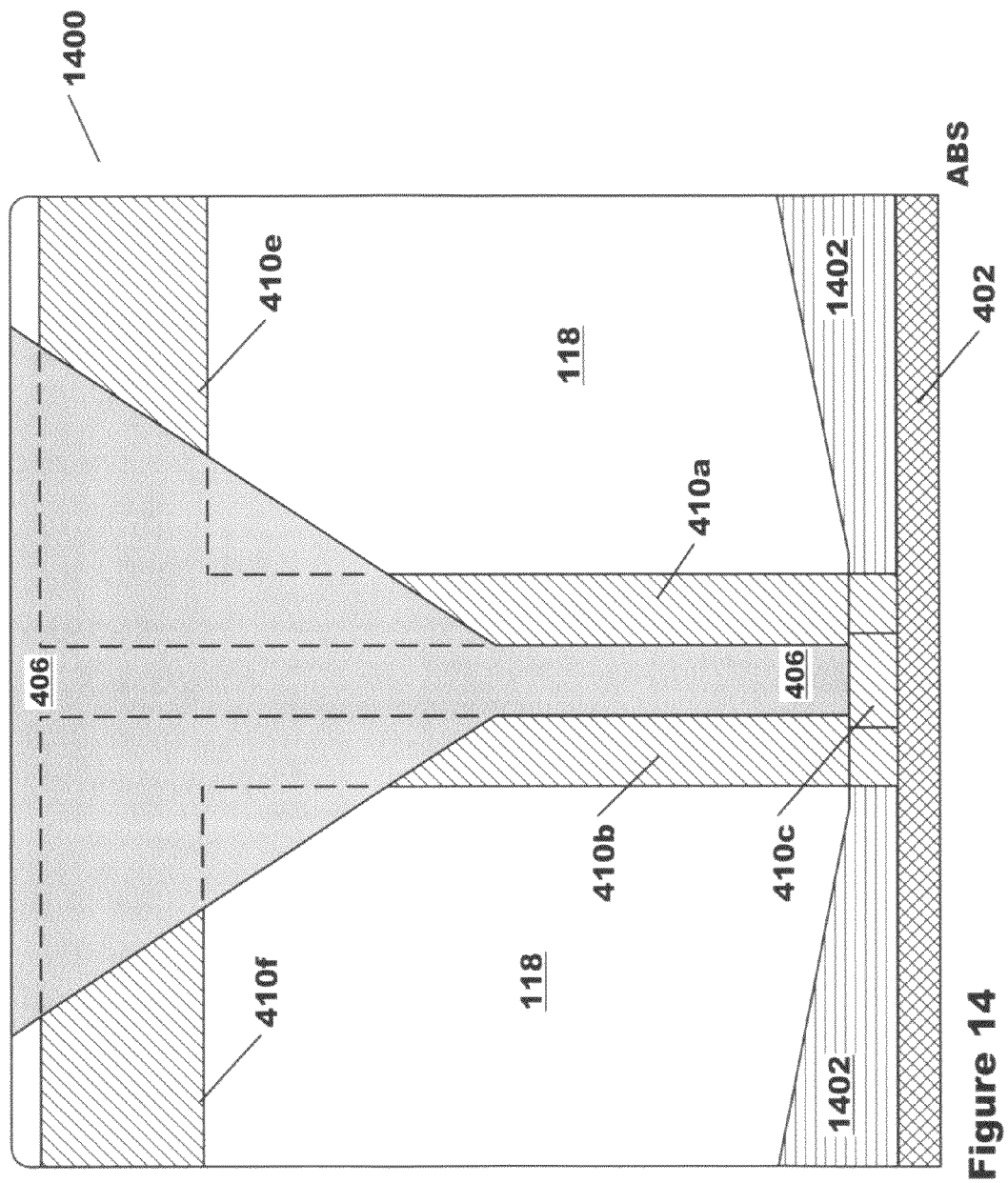
FIG. 14 is a partial plan view of an auxiliary half coil having electrically insulating heat sinks at the ABS, in accordance with an embodiment of the present invention.
Figure 15:
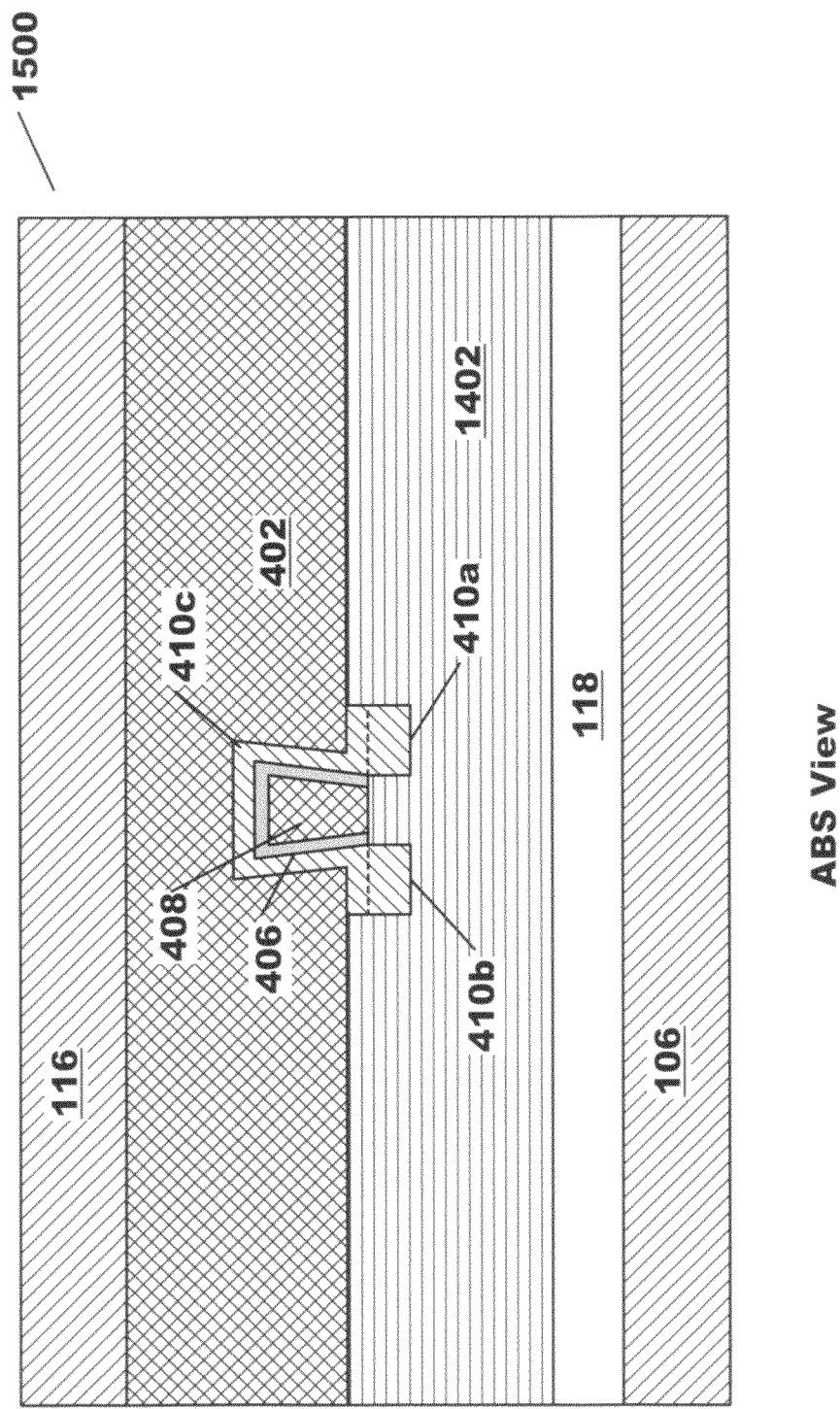
FIG. 15 is an ABS view of the structure of FIG. 14, in accordance with an embodiment of the present invention.

FIG. 14 is a partial plan view 1400 of an auxiliary half coil 410c having electrically insulating heat sinks 1402 at the ABS, in accordance with an embodiment of the present invention. FIG. 15 is an ABS view 1500 of the structure of FIG. 14. This embodiment is similar to those shown in FIGS. 4, 5, except that metal heat sinks 404a, b have been replaced by a thermally conductive, but electrically insulating heat sink 1402. Suitable materials for heat sink 1402 include, but are not limited to DLC (diamond like carbon), silicon nitrides, silicon carbides, and poly silicon. The electrically insulating nature of the heat sinks 1402 assures that a significant portion of the electrical current flowing through the auxiliary half coil 410c flows through conductive elements 410a,b.

Figure 16:
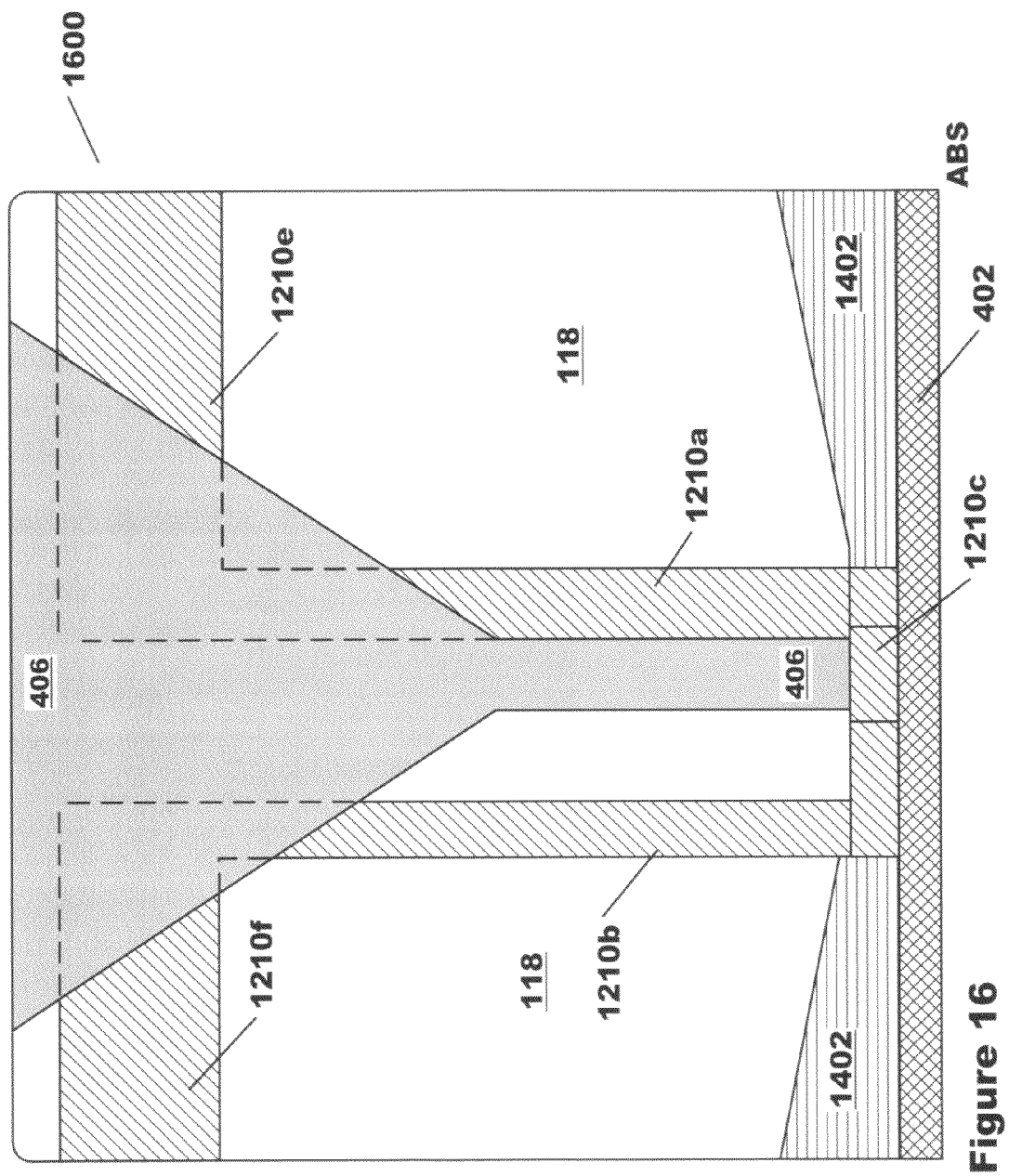
FIG. 16 is a partial plan view of an auxiliary half coil having electrically insulating heat sinks at the ABS and asymmetric current feed, in accordance with an embodiment of the present invention.
Figure 17:
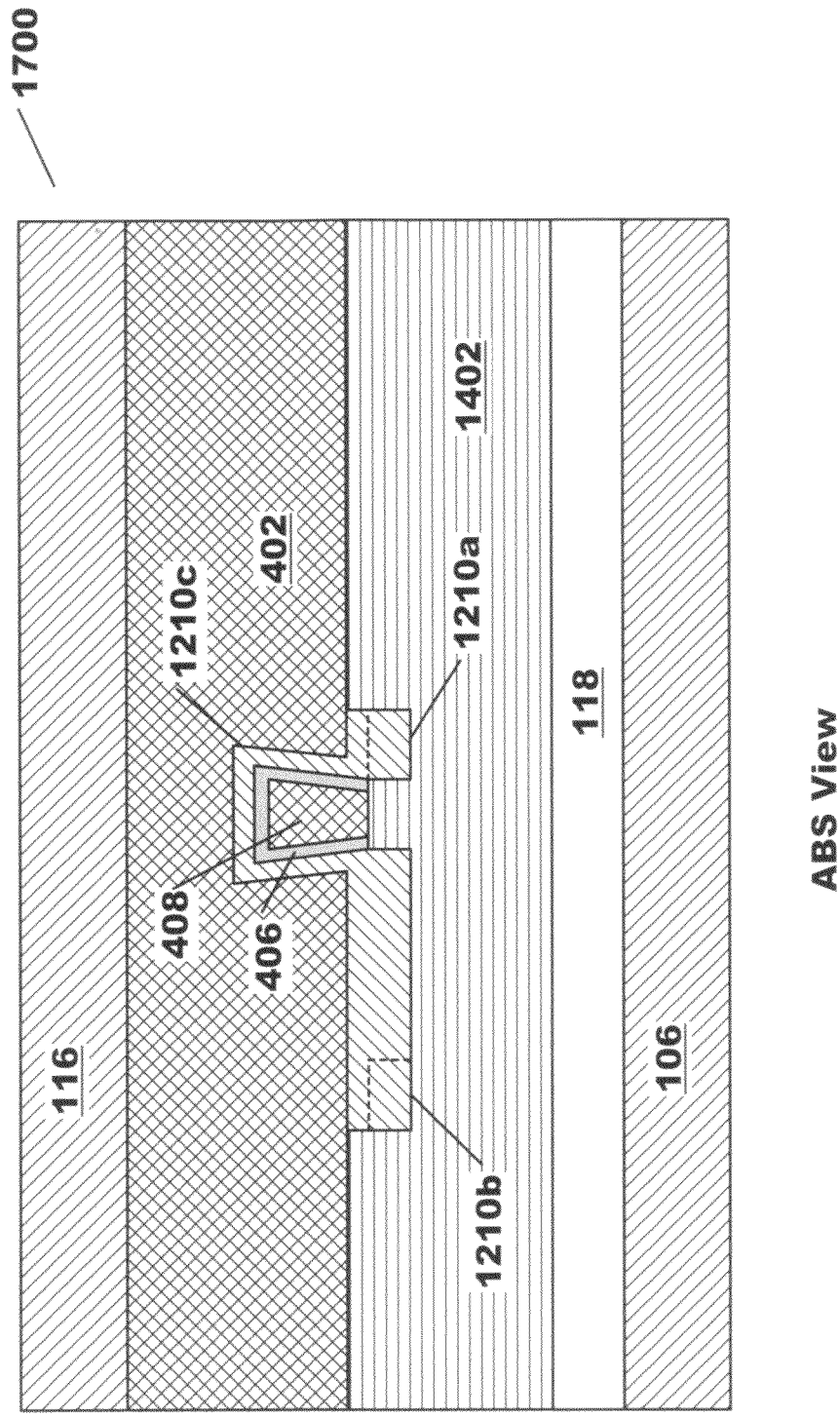
FIG. 17 is an ABS view of the structure of FIG. 16, in accordance with an embodiment of the present invention.

FIG. 16 is a partial plan view 1600 of an auxiliary half coil 1210c having electrically insulating heat sinks 1402 at the ABS and asymmetric current feed, in accordance with an embodiment of the present invention. Current is delivered to auxiliary half coil 1210c via conductive elements 1210a,b,e,f. FIG. 17 is an ABS view 1700 of the structure of FIG. 16. This embodiment is similar to that of FIGS. 14, 15, except that symmetric current feed has been replaced with asymmetric current feed. The electrically insulating nature of the heat sinks 1402 assures that a significant portion of the electrical current flowing through the auxiliary half coil 410c flows through conductive elements 1210a,b.

Figure 18A:
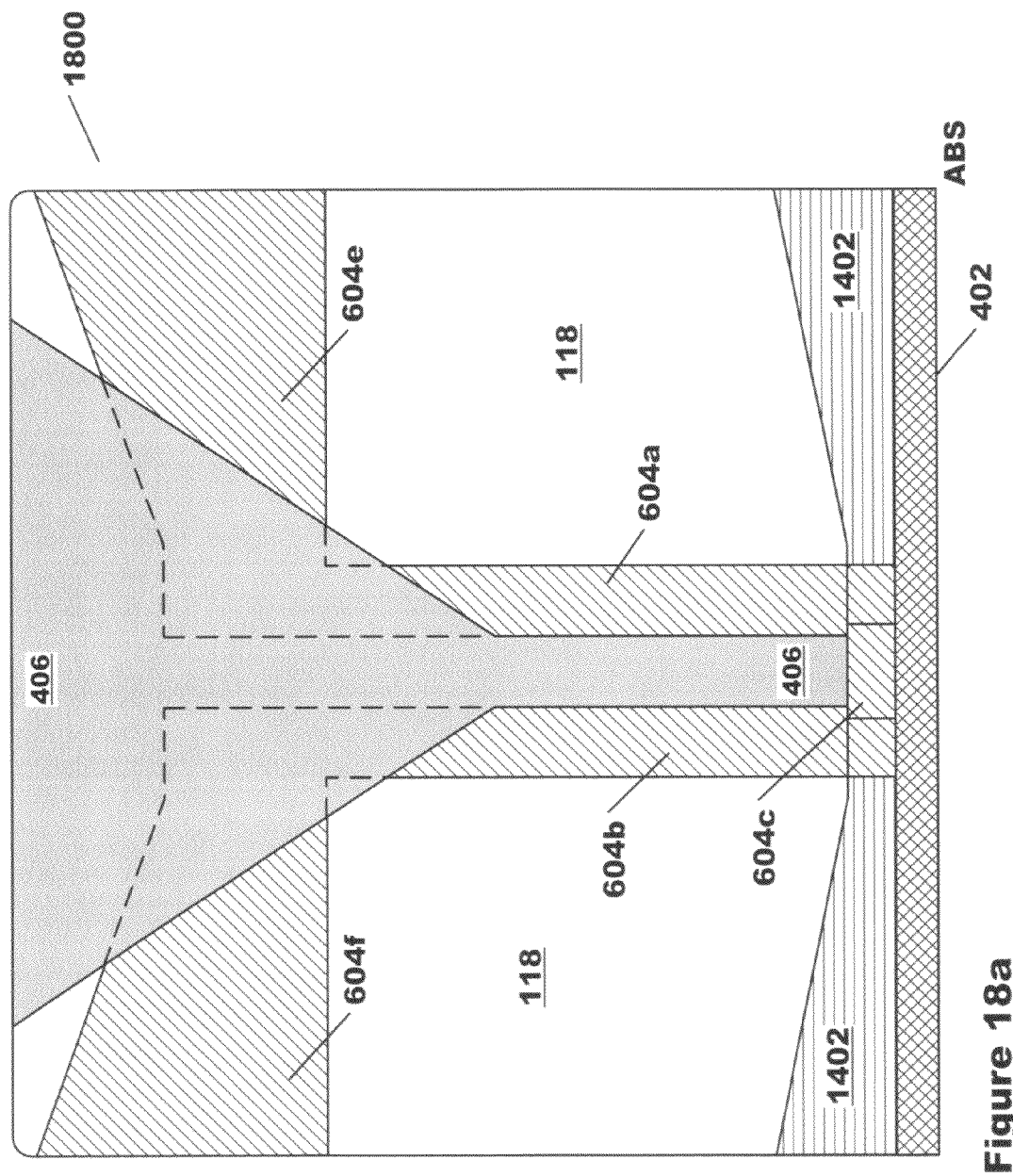
FIG. 18a is a plan view of an auxiliary half coil having both recessed heat sinks and electrically insulating heat sinks at the ABS, in accordance with an embodiment of the present invention.
Figure 19A:
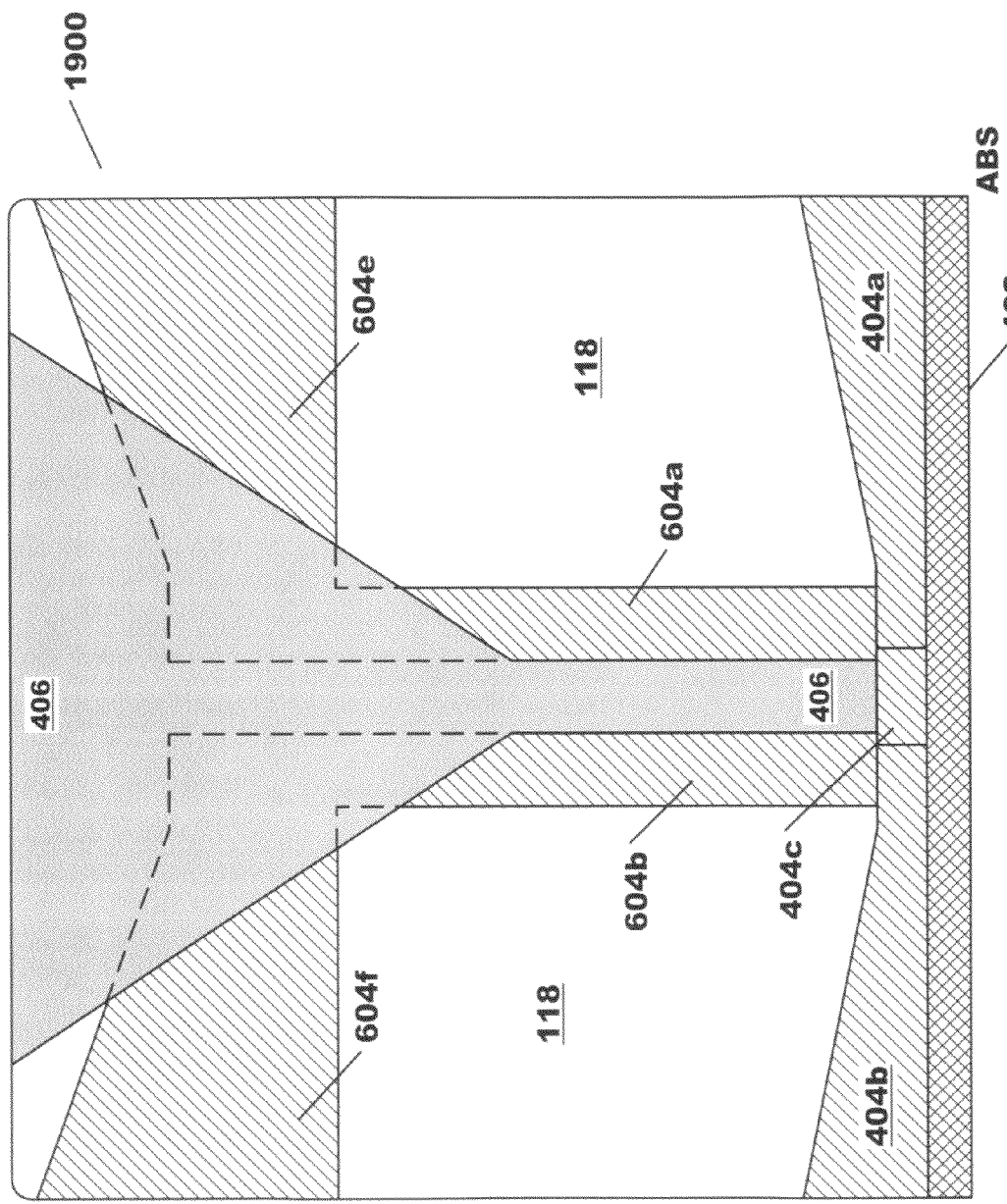
FIG. 19a is a plan view of an auxiliary half coil having both recessed heat sinks and metallic heat sinks at the ABS, in accordance with an embodiment of the present invention.

FIG. 18a is a plan view 1800 of an auxiliary half coil 604c having both recessed heat sinks 604e,f and electrically insulating heat sinks 1402 at the ABS, in accordance with an embodiment of the present invention. Current feed is symmetric. This embodiment combines the cooling power of both sets of heat sinks to handle higher current configurations, or to reduce temperatures further than those obtained with either a single set of recessed heat sinks or heat sinks present only at the ABS. FIG. 19a is a plan view 1900 of an auxiliary half coil 404c having both recessed heat sinks 604e,f and conductive heat sinks 404a,b at the ABS in a symmetric current feed configuration.

Figure 18B:
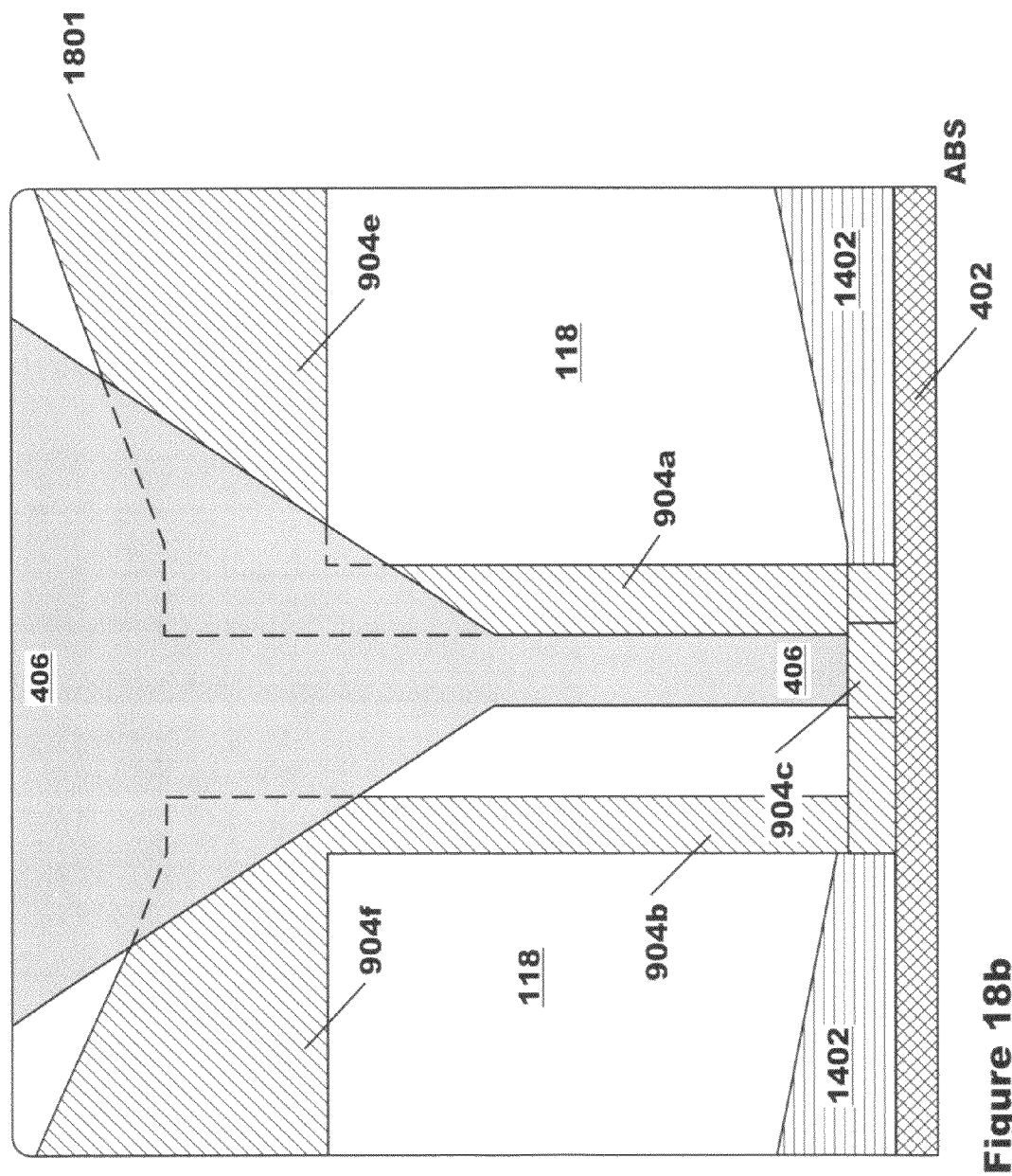
FIG. 18b is a plan view of an auxiliary half coil having recessed heat sinks, electrically insulating heat sinks at the ABS, and asymmetric current feed, in accordance with an embodiment of the present invention.
Figure 19B:
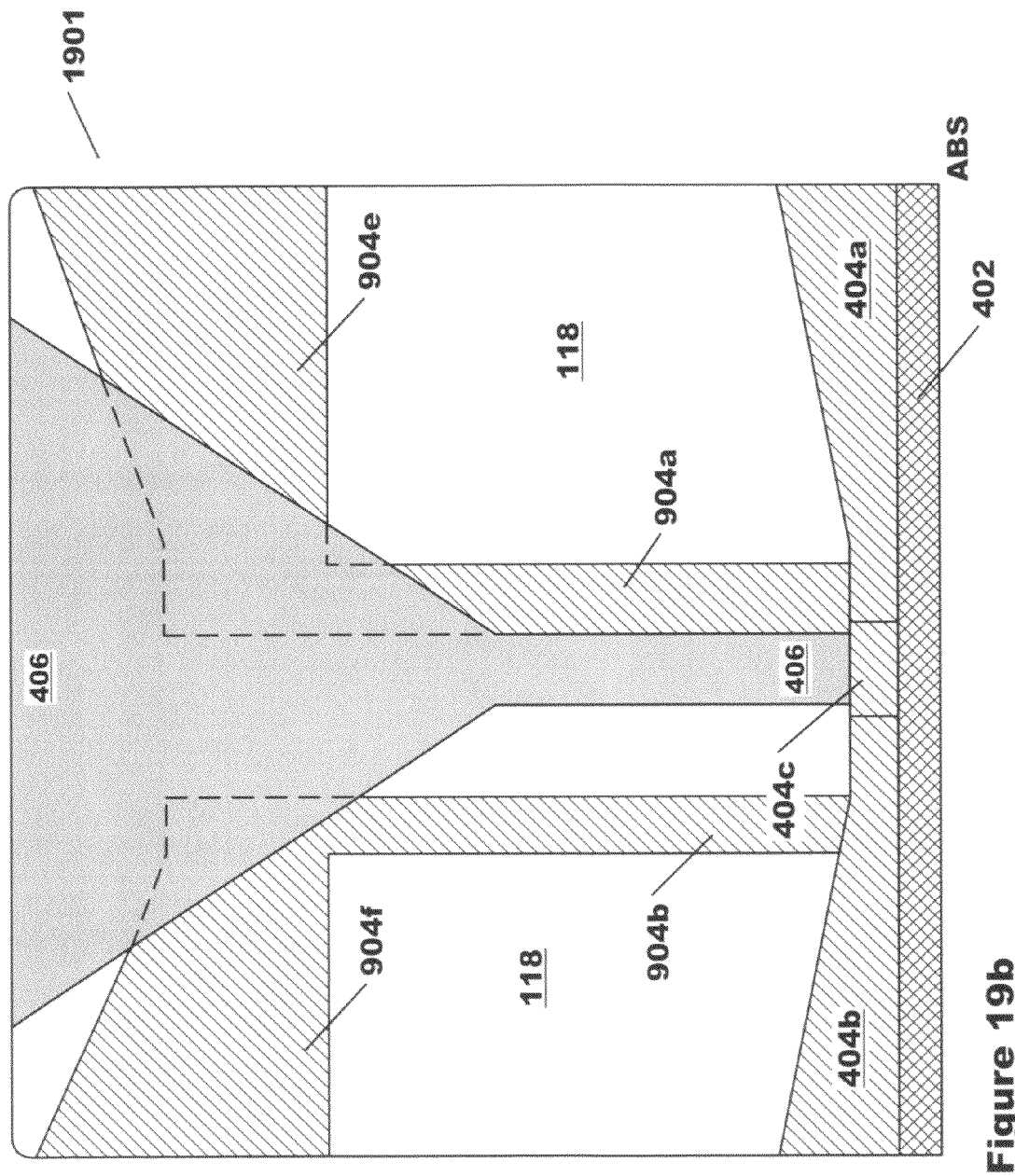
FIG. 19b is a plan view of an auxiliary half coil having recessed heat sinks, metallic heat sinks at the ABS, and asymmetric current feed, in accordance with an embodiment of the present invention.

FIG. 18b is a plan view 1801 of an auxiliary half coil 904c having recessed heat sinks 904e,f, electrically insulating heat sinks 1402 at the ABS, and asymmetric current feed, in accordance with an embodiment of the present invention. FIG. 19b is a plan view 1901 of an auxiliary half coil 404c having recessed heat sinks 904e,f, conductive heat sinks 404a,b at the ABS, and asymmetric current feed.

Figure 20:
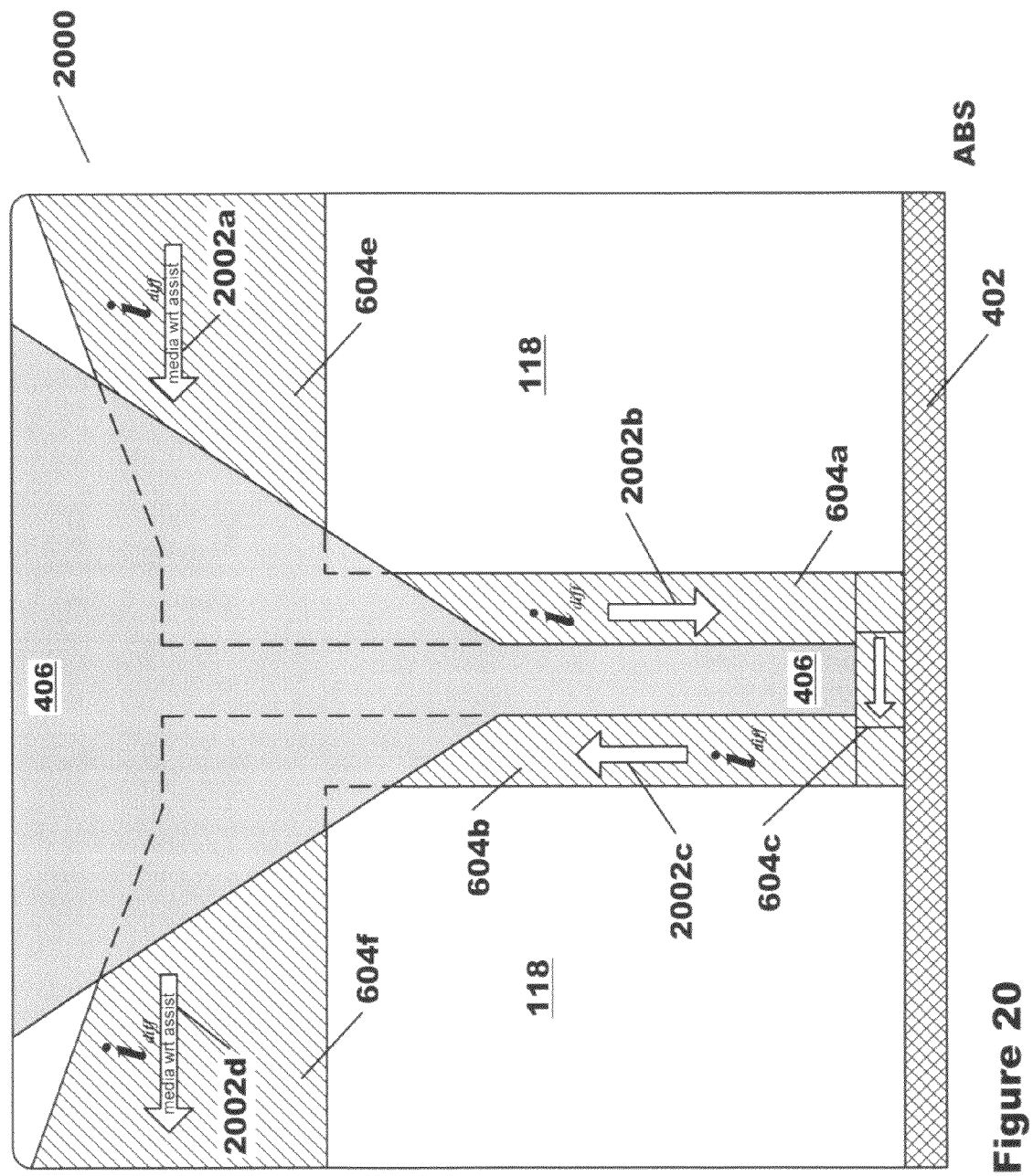
FIG. 20 is a plan view of an auxiliary half coil having differential mode current flows for media write assist and symmetric current feed, in accordance with an embodiment of the present invention.

FIG. 20 is a plan view 2000 of an auxiliary half coil 604c having differential mode current flows for media write assist and symmetric current feed, in accordance with an embodiment of the present invention. FIG. 20 illustrates the current flow paths for differential current flow through the auxiliary half coil. A structure (from FIGS. 6, 7, and 8) having recessed heat sinks is used as an example, but it will be evident to those skilled in the art that any of previously disclosed embodiments having symmetric current feed could be used. Arrows 2002a,b,c,d indicate "instantaneous" direction of flow, since currents are AC signals having RF frequencies or data-derived signals. The term "differential" refers to the case where current 2002c,d is approximately equal to current 2002a,b, but flows in opposite directions parallel to the pole. This current is approximately equal to current flowing through the auxiliary half coil 604c. Currents 2002b and 2002c may not be precisely equal if there is any current flow to common (ground) via parasitic capacitance effects. These parasitic currents are expected to be small in comparison to the main current flow due to the low impedance of the auxiliary half coil and conductors 604a,b,e,f. For media write assist, the differential current flow through the half coil is significant.

As an example, current levels on the order of 10 to 15 mA are required to produce a 1K Oe vertical magnetic field strength. These levels produce a current density of 1 to $2\times10^9$ A/cm$^2$ in a auxiliary half coil of cross section dimensions of about 20 nm×40 nm. RF frequencies for media write assist are between 10 and 50 GHz. Although significant, these current levels are considerably lower than WAMR heads of the prior art which can require as much as 80 to 100 mA.

Figure 21:
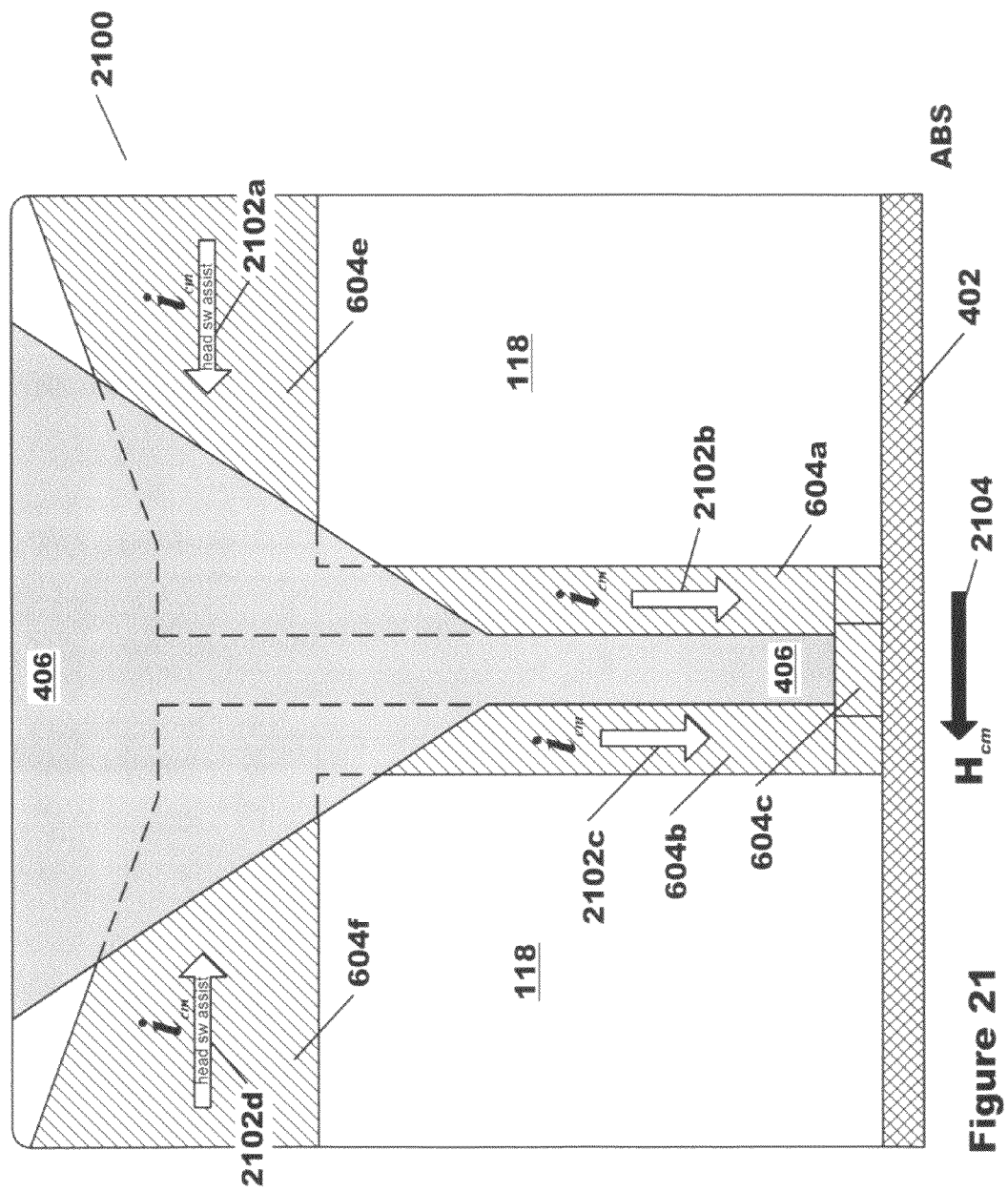
FIG. 21 is a plan view of an auxiliary half coil having common mode current flows for head switching assist and symmetric current feed, in accordance with an embodiment of the present invention.

FIG. 21 is a plan view 2100 of an auxiliary half coil 604c having common mode current flows for head switching assist and symmetric current feed, in accordance with an embodiment of the present invention. In order to provide the second write assist component, head switching assist, an in-plane (horizontal) magnetic field 2104 must be provided at the pole tip (at the ABS). One method for doing this is to generate two common mode currents 2102c and 2102b in each of two conductive elements 604b and 604a, respectively. The term "common mode" refers to currents in conductors 604a, 604b having the same "instantaneous" flow direction parallel to the pole. Currents 2102 are AC signals having RF frequencies about an order of magnitude lower than those used for media write assist or a data-derived signal. Since the currents in conductive elements 604a and 604b are flowing in the same direction, the horizontal magnetic field components created by these current reinforce, creating a magnetic field $H_{cm}$ 2104 of approximately 100 to 200 Oe.

Figure 22:
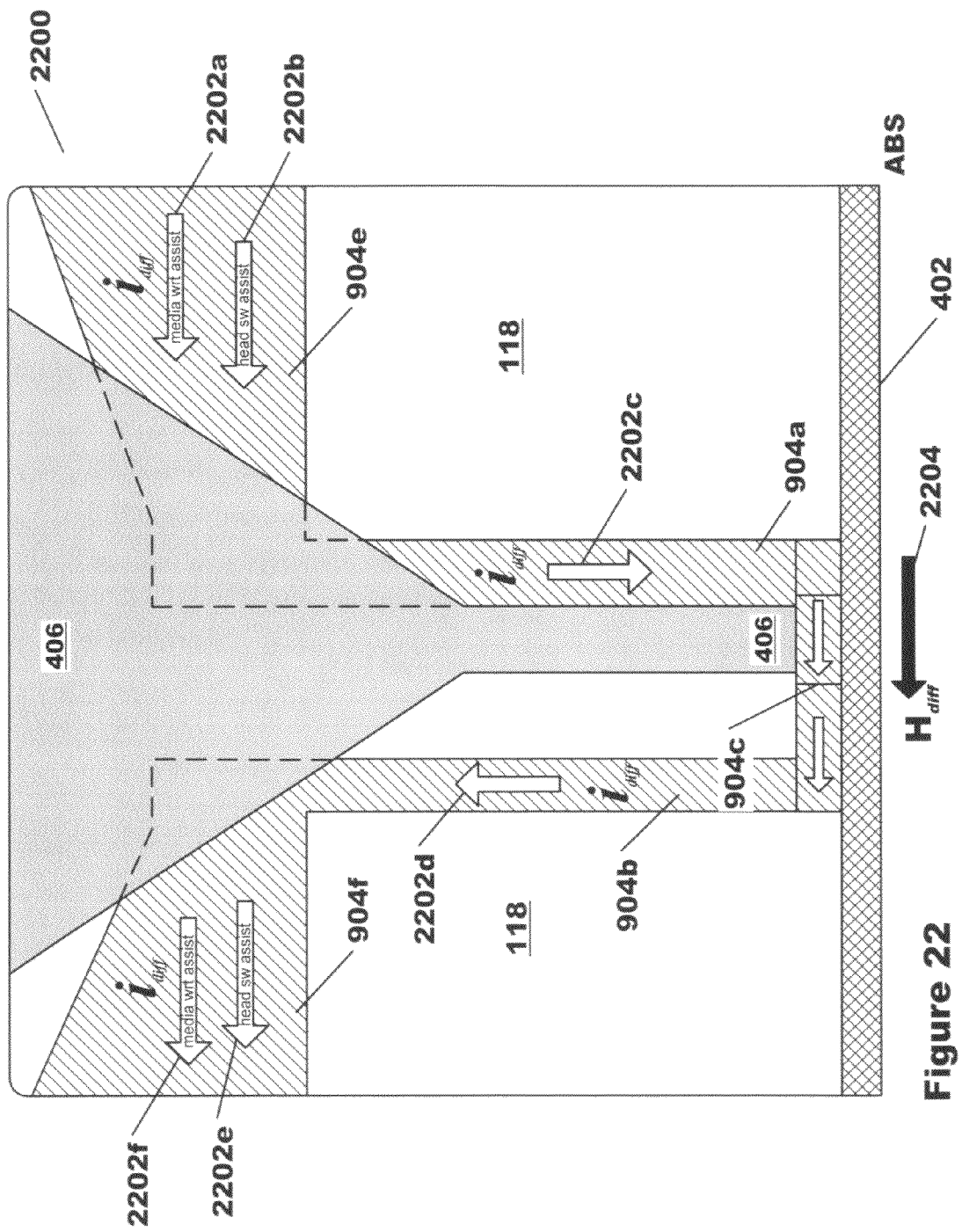
FIG. 22 is a plan view of an auxiliary half coil having differential mode current flows for both head switching assist and media write assist, using asymmetric current feed, in accordance with an embodiment of the present invention.

FIG. 22 is a plan view 2200 of an auxiliary half coil 904c having differential mode current flows for both head switching assist and media write assist, using asymmetric current feed, in accordance with an embodiment of the present invention. A structure (from FIGS. 9, 10, and 11) having recessed heat sinks is used as an example, but it will be evident to those skilled in the art that any of previously disclosed embodiments having asymmetric current feed could be used. The use of an asymmetric current feed geometry allows the use of differential current flow to generate both media write assist and head switching assist. For media write assist, the explanation is exactly as discussed above in FIGS. 20, 21 and won't be repeated. For head switching assist, differential current flows can be used to generate a in-plane (horizontal) field $H_{diff}$ 2204 because one conductor 904a is in close proximity to the pole, and the horizontal field is dominated by current 2202c flowing in this conductor element. Current flowing away from the half coil 904c would normally produce an equal and opposite magnetic field component that would reduce $H_{diff}$ to zero, if the return conductive element 904b were residing immediately adjacent the pole. However, relocating 904b to a position displaced from the pole significantly reduces the impact of an opposing magnetic field component, allowing a significant field component $H_{diff}$ to remain to provide the desired head switching assist function.

Figure 23B:
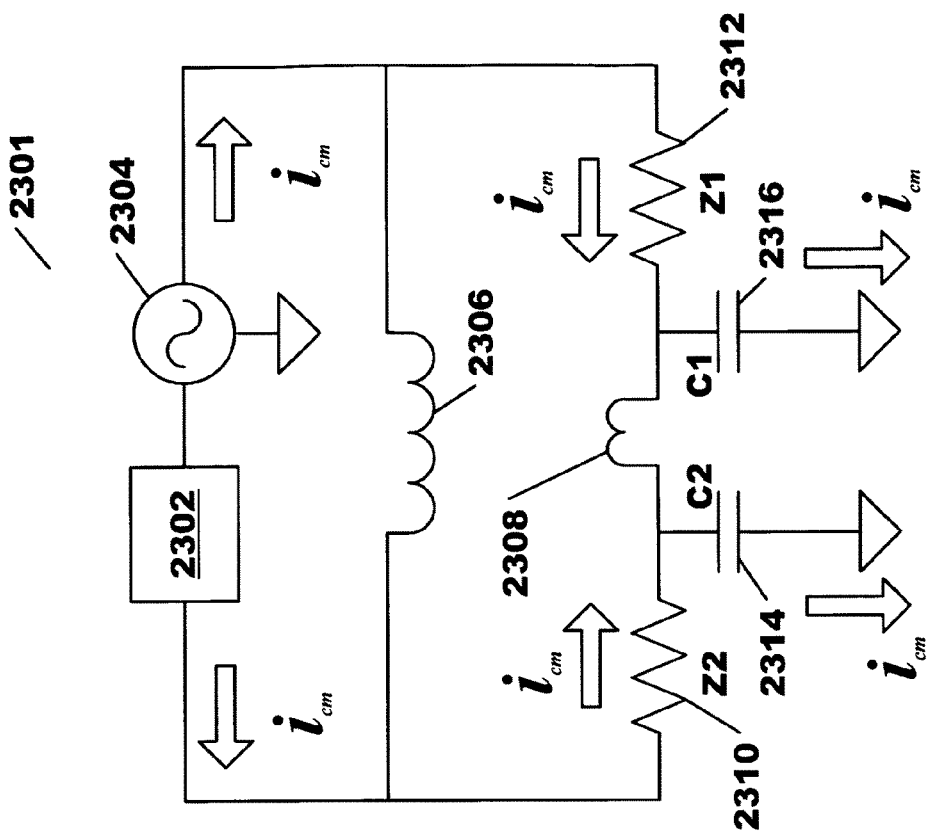
FIG. 23b is a schematic view of a circuit diagram for providing common mode currents to an auxiliary half coil, in accordance with an embodiment of the present invention.
Figure 23A:
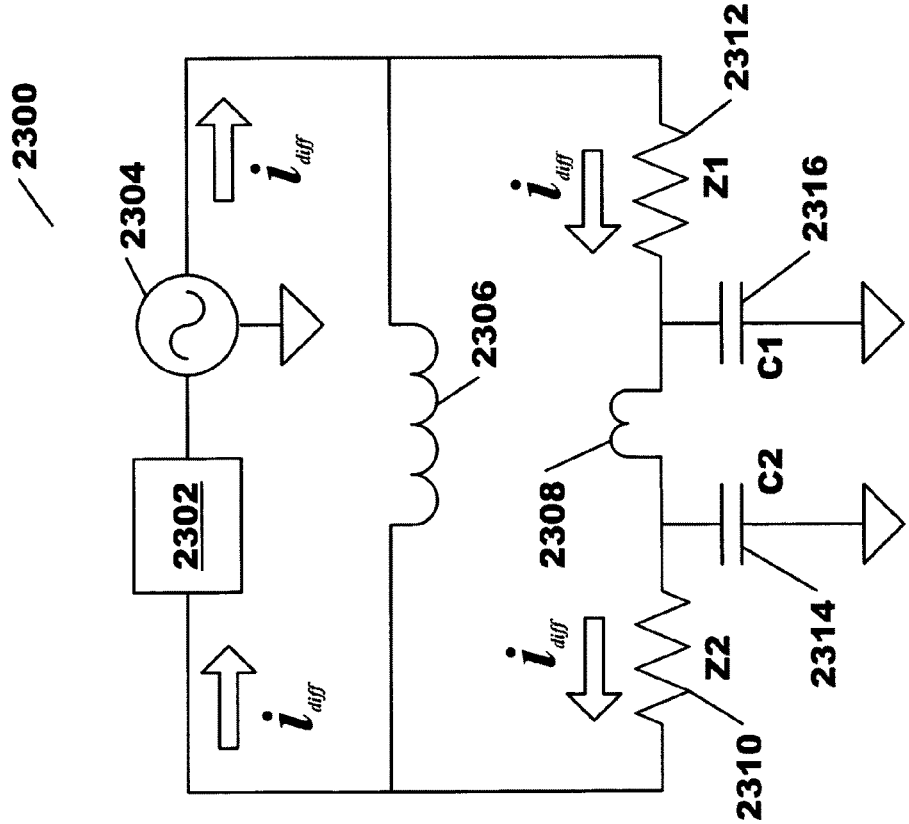
FIG. 23a is a schematic view of a circuit diagram for providing differential mode currents to an auxiliary half coil, in accordance with an embodiment of the present invention.

FIG. 23a is a schematic view of a circuit diagram 2300 for providing differential mode currents to an auxiliary half coil 2308, in accordance with an embodiment of the present invention. In this configuration, auxiliary half coil 2308 is connected in parallel with main coil 2306. This is the simplest connection configuration that requires no additional wiring in the suspension for the auxiliary half coil 2308. Data driver 2302 is responsible for providing the data waveforms that are to be written to the storage media. RF generator 2304 provides the signals for both write assist components; media write assist and head switching assist. While shown as separate devices for functional clarity, it will be recognized by those skilled in the art that devices 2302 and 2304 can be combined into a single device that provides all waveforms. Impedances Z1 (ref 2312) and Z2 (ref 2310) contain the impedances of the asymmetric or symmetric conductive elements and heat sinks shown in previous embodiments, along with other resistive, capacitive, or inductive components necessary to adjust the current flow through the half coil relative to that of the main coil 2306. Capacitive components C1 (ref 2316) and C2 (ref 2314) represent parasitic components coupling the conductors and auxiliary half coil to a common ground reference. Arrows labeled $i_{diff}$ indicate current flow directions for differential mode current. Depending on the specific conductor geometry connecting the auxiliary half coil 2308, (i.e. symmetric or asymmetric), $i_{diff}$ may contain signals for media writing assist, with or without head switching assist waveforms.

FIG. 23b is a schematic view of a circuit diagram 2301 for providing common mode currents to an auxiliary half coil 2308, in accordance with an embodiment of the present invention. In this case the common mode head switching assist current $i_{cm}$ produced by generator 2304 flows through impedances Z1 and Z2 (refs 2312, 2310) and parasitic capacitances C1 and C2 (refs 2316, 2314) to common. Very little common mode current flows through auxiliary half coil 2308. Common mode current flow is utilized for head switching assist having a symmetric half coil connection structure, in accordance with embodiments previously disclosed.

Figure 24:
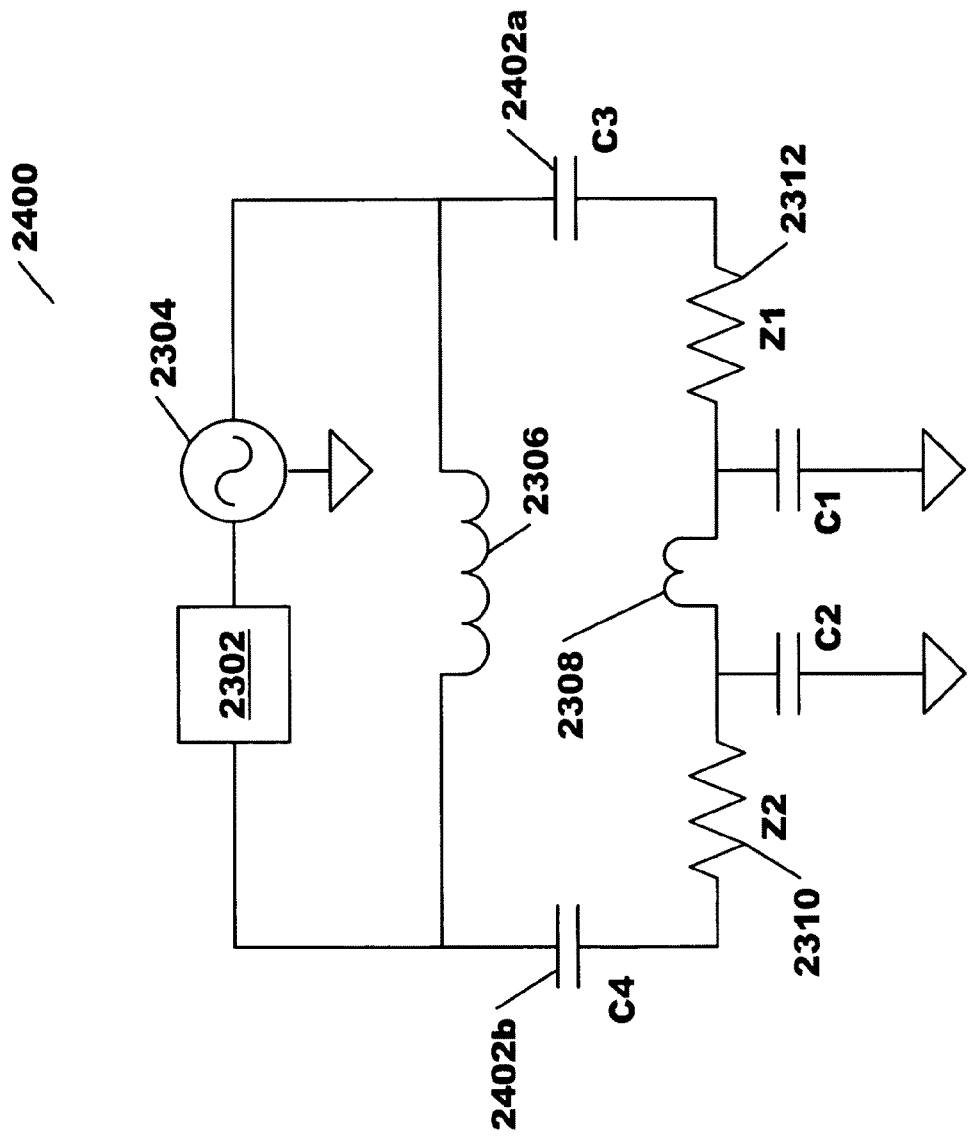
FIG. 24 is a schematic view of a circuit diagram wherein the auxiliary half coil is connected via capacitive coupling, in accordance with an embodiment of the present invention.

FIG. 24 is a schematic view of a circuit diagram 2400 wherein the auxiliary half coil 2308 is connected via capacitive coupling, in accordance with an embodiment of the present invention. In this embodiment, capacitors C3 (ref 2402a) and C4 (ref 2402b) are added to the circuit of FIGS. 23a,b. These capacitors are placed between the auxiliary half coil 2308 and generators 2302 and 2304, for the purpose of reducing low frequency components and DC, primarily from the data waveforms generated by generator 2302. They are transparent to the RF signals produced by generator 2304. Since the data waveforms are digital pulse train signals (see for example waveform 2702 in FIG. 27) with fast low to high and high to low signal transitions, coupling capacitors C3 and C4 convert the data waveform to a series of pulses having a sharp transition followed by a decaying tail; the sharp transition occurring at the data signal high to low and low to high transitions. See for example waveform 2706 in FIG. 27 below. This data-derived pulse signal is useful for providing an effective enhancement for writing sharp transition in the media. These pulses are thus an alternative for writing assist embodiments. Since capacitors C3 and C4 are also transparent (have low impedance) to RF signals, the circuit 2400 is suitable for use with media assist RF signals and head switching assist RF signals as well.

Figure 25A:
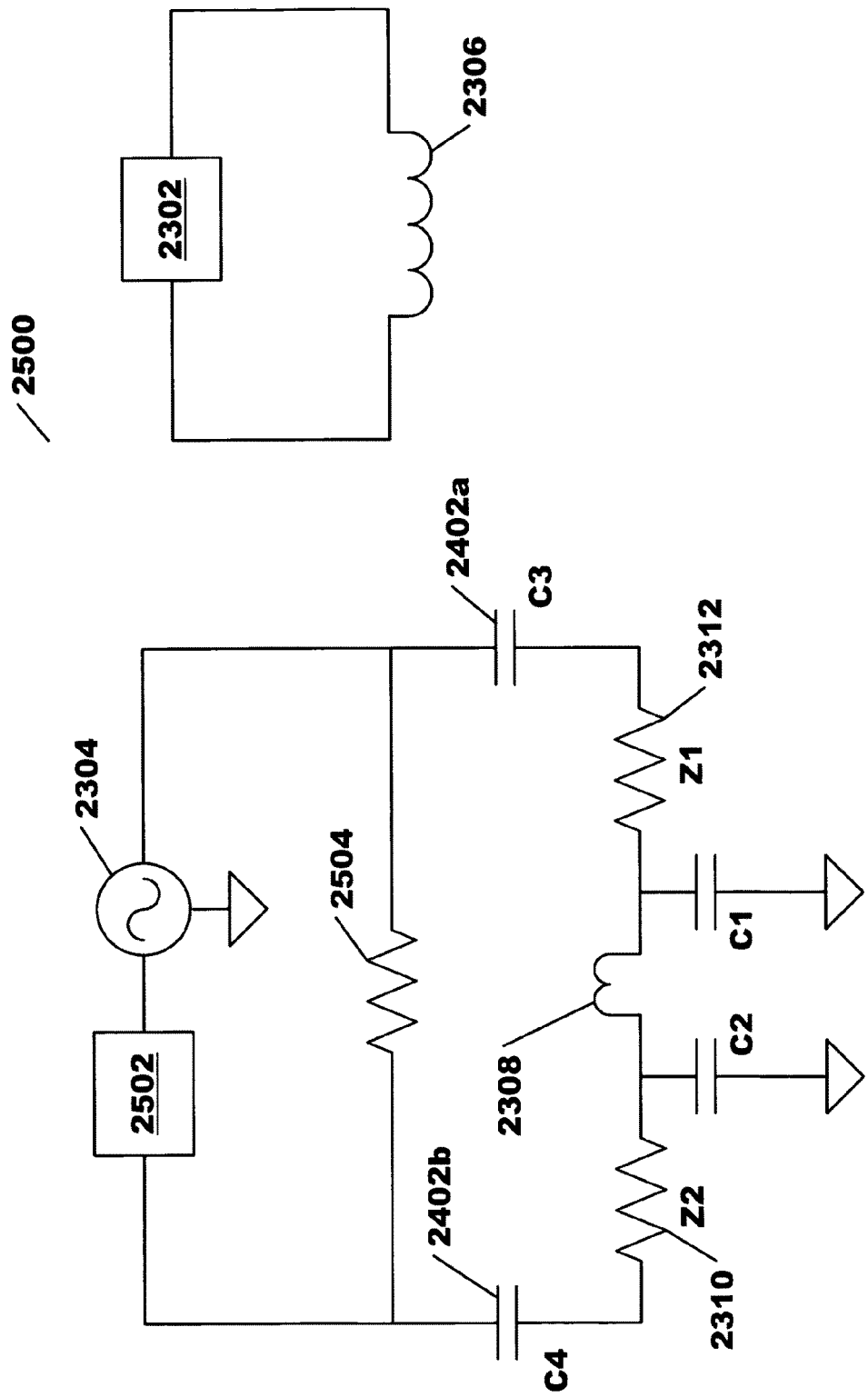
FIG. 25a is a schematic view of a circuit diagram wherein the auxiliary half coil is connected to the thermal flight control system via capacitive coupling, in accordance with an embodiment of the present invention.

FIG. 25a is a schematic view 2500 of a circuit diagram wherein the auxiliary half coil 2308 is connected to the thermal flight control system via capacitive coupling, in to accordance with an embodiment of the present invention. The main coil 2306 is connected directly to data driver 2302. In the previous embodiments of FIGS. 23a,b and 24, the auxiliary half coil was driven through the main coil connecting network. This configuration, while simple and requiring no additional wiring (in the arm suspension) from that of a standard data writing configuration, produces drive complexities since both the data signals, media write assist RF signals, and the head switching assist signals are delivered to both the main coil 2306 and the auxiliary half coil 2308. In particular, the complexity of the data generator 2302 combined with the RF generator 2304 may increase the costs of the system by an amount exceeding the savings of the simplified wiring configuration. Further, the different impedances of the auxiliary half coil and the main coil require more complex components Z1 and Z2 to keep the appropriate current signal levels in each coil.

For systems equipped with a thermal flight control system (TFC), the embodiments of FIG. 25a provide a useful alternative. A TFC system typically contains a resistive heater 2504 embedded in the thin film read/write head structure, that alters the temperature of that structure, which in turn alters the shape of the head surface at the ABS via thermal expansion effects. This "shape shifting" affects the aerodynamic drag of the head flying over the media surface and alters the "fly height", or the distance that the ABS of the head resides above the media while the media is in motion. A control system 2502 determines the heating power in the embedded resistor 2504, typically by applying a DC voltage across resistor 2504. Since the TFC system is wired separately from the main data coil, one can connect the auxiliary half coil 2308 to the TFC system, and avoid the interactive and drive problems of concern above, while still utilizing wiring already present in the current manufactured configuration.

Returning to FIG. 25a, RF generator 2304 is connected in series with TFC controller 2502. Since the output of controller 2502 is primarily a DC voltage, the combined output signal of 2304 and 2502 would simply be an RF signal having a DC offset. Capacitors C3 and C4 (refs 2402a,b) serve to block the DC component so the auxiliary half coil 2308 only sees the RF signals from generator 2304, and the low impedance of the auxiliary half coil does not load down the DC generator output of TFC controller 2502. The higher impedance of resistive heater 2504 is expected to have little impact on RF generator 2304. The lower impedance of the half coil directs most of the RF current through the half coil 2308 instead of the TFC element 2504.

In this circuit configuration, RF signal media assist, RF signal head switching assist, and data derived media writing assist can be utilized. For data derived media writing assist, generator 2304 would be modified to provide the combined data and RF signals, as was done in the previously discussed embodiments.

Figure 25B:
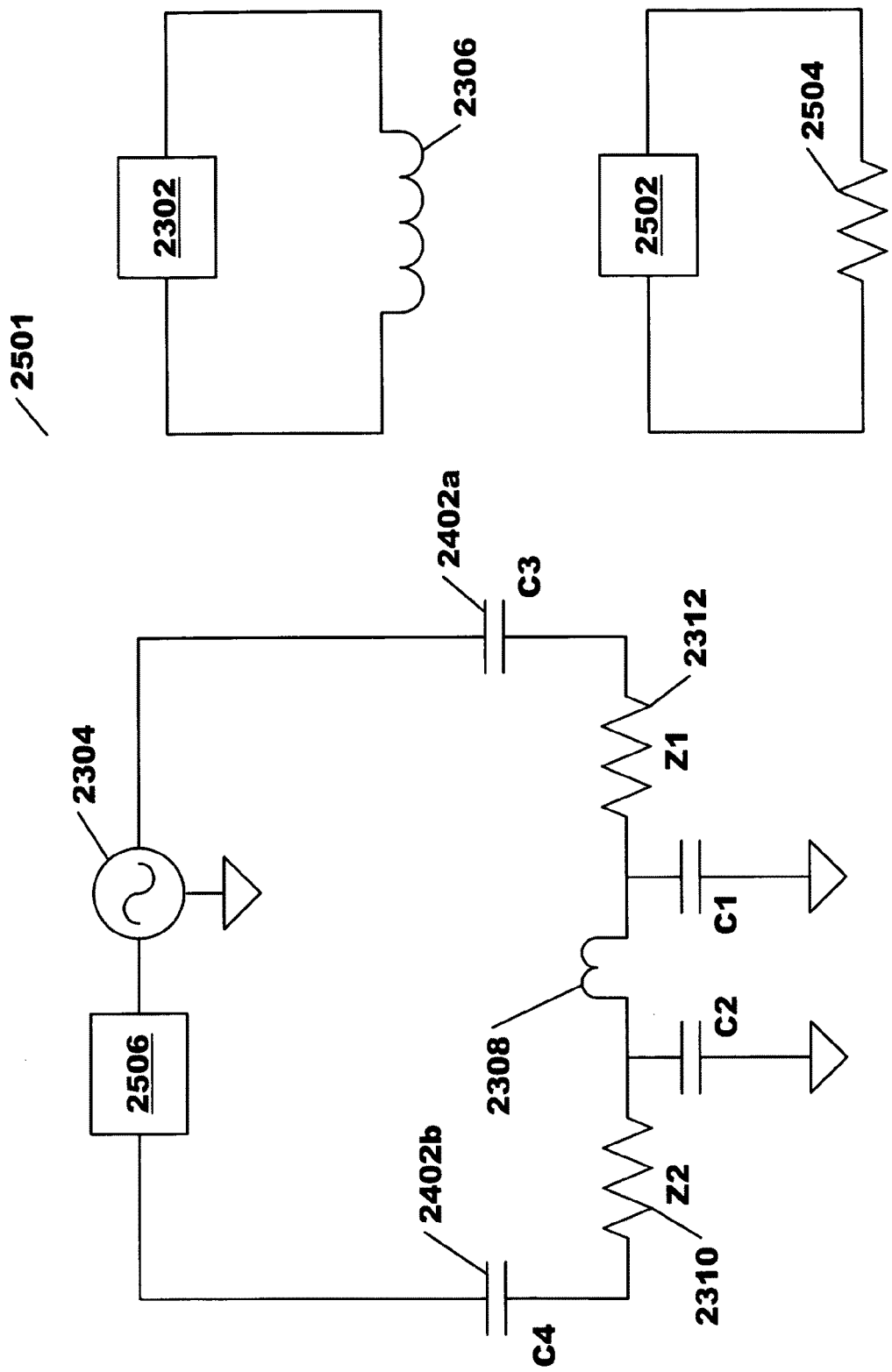
FIG. 25b is a schematic view of a circuit diagram wherein the auxiliary half coil is connected independently of the thermal flight control system and the main coil, in accordance with an embodiment of the present invention.

FIG. 25b is a schematic view 2501 of a circuit diagram wherein the auxiliary half coil 2308 is driven independently of the thermal flight control system (controller 2502, heater 2504) and the main coil 2306, in accordance with an embodiment of the present invention. Additional wiring need be provided to operate the auxiliary half coil. This configuration may be useful for systems not equipped with TFC, where the drive interactions of the embodiments of FIGS. 23a,b and 24 are not desirable. RF signal media assist, RF signal head switching assist, and data derived media writing assist can be utilized. Device 2506 serves as a data waveform generator to produce data derived media writing assist signals. If these are not required, then device 2506 and capacitors C3 and C4 can be removed.

Figure 26:
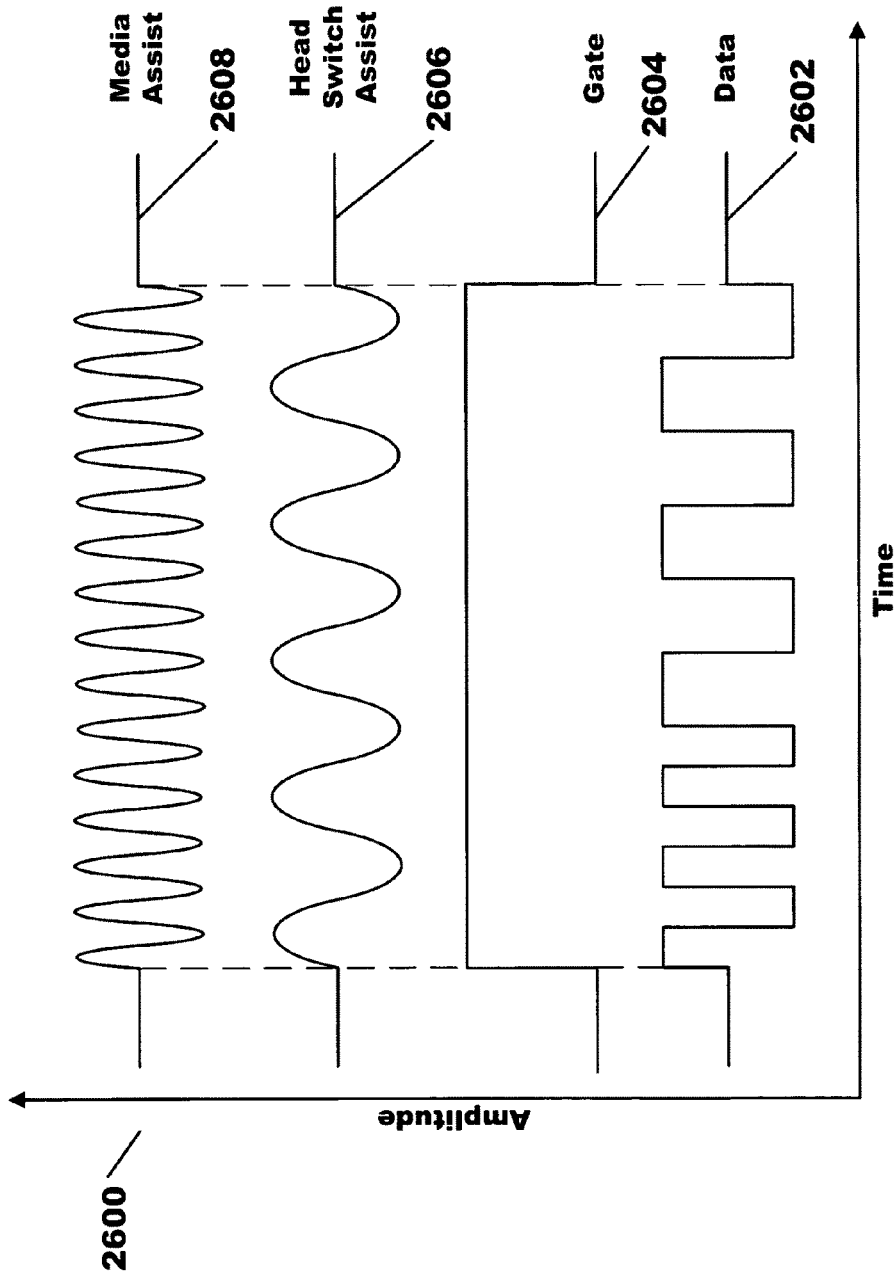
FIG. 26 is a schematic view of a waveform timing diagram of media write assist and head switching assist RF waveforms, in accordance with an embodiment of the present invention.

FIG. 26 is a schematic view of a waveform timing diagram 2600 of media assist and head switching assist RF sinusoidal waveforms, in accordance with an embodiment of the present invention. Waveform 2602 represents a typical digital data signal being written to the media by the perpendicular write head. These waveforms may have a finite length representing a data string. Waveform 2604 represents a "gating" waveform that is "true" or "on" during the presence of data being written, and "off" when no data is present. This gating waveform is useful for turning on and off the RF waveforms utilized for write assist to save power and provide the RF assist signals only when necessary. Waveform 2606 represents the lower frequency head switching assist RF sinusoidal waveform, typically between 1 and 5 GHz in frequency. Waveform 2608 represents the higher frequency media writing assist RF sinusoidal waveform, typically between 10 and 50 GHz in frequency. The forgoing waveforms represent those produced by the generators. As will be appreciated by those skilled in the art, the waveforms present across the main coil or the auxiliary half coil will be modified complex combinations of these. As previously presented, the media write assist current would have the waveform shape of signal waveform 2608, and would flow through the auxiliary half coil in differential mode. The head switching assist current would have the waveform shape of signal waveform 2606, and would flow through the auxiliary half coil in differential mode for the case of asymmetric current feed; or in common mode for the case of symmetric current feed. It should be recognized that common mode currents can also be utilized for asymmetric current feed, although this embodiment is less preferred since the field strength at the pole tip would be less than the case of symmetric current feed.

Figure 27:
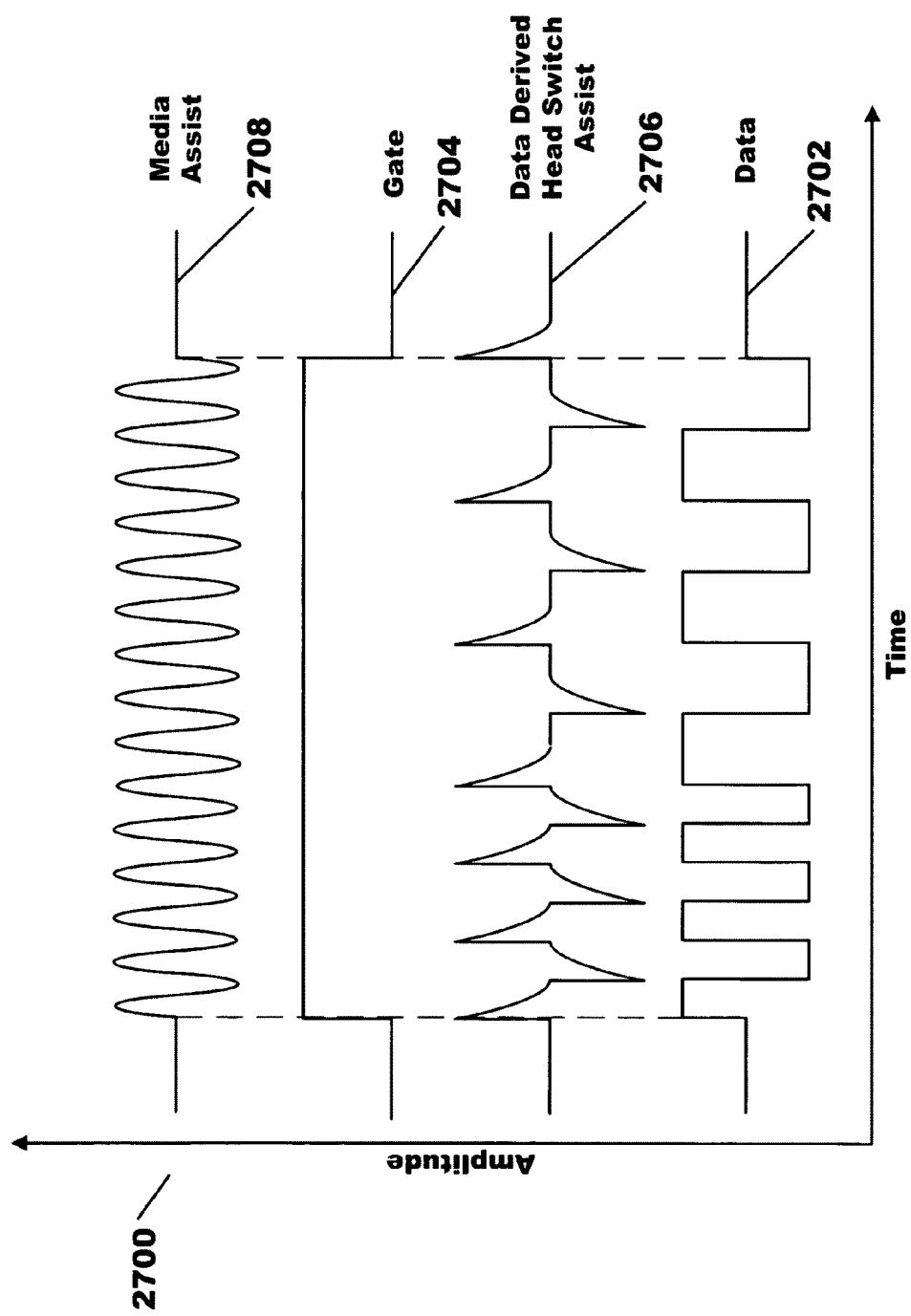
FIG. 27 is a schematic view of a waveform timing diagram of a data derived head switching assist waveform, in accordance with an embodiment of the present invention.

FIG. 27 is a schematic view of a waveform timing diagram 2700 of a data derived head switching assist waveform, in accordance with an embodiment of the present invention. In this diagram, the head switching assist RF sinusoidal waveform 2606 of FIG. 26 has been replaced by a data derived head media writing assist signal 2706. Signal 2706 is used in combination with media write assist RF sinusoidal waveform 2708. The media write assist current would have the waveform shape of signal waveform 2708, and would flow through the auxiliary half coil in differential mode. The head switching assist current would have the waveform shape of signal waveform 2706, and would flow through the auxiliary half coil in differential mode for the case of asymmetric current feed; or in common mode for the case of symmetric current feed. Waveform 2702 represents a typical digital data signal being written to the media by the perpendicular write head and waveform 2704 represents a "gating" waveform that is "true" or "on" during the presence of data being written, and "off" when no data is present.

Figure 28:
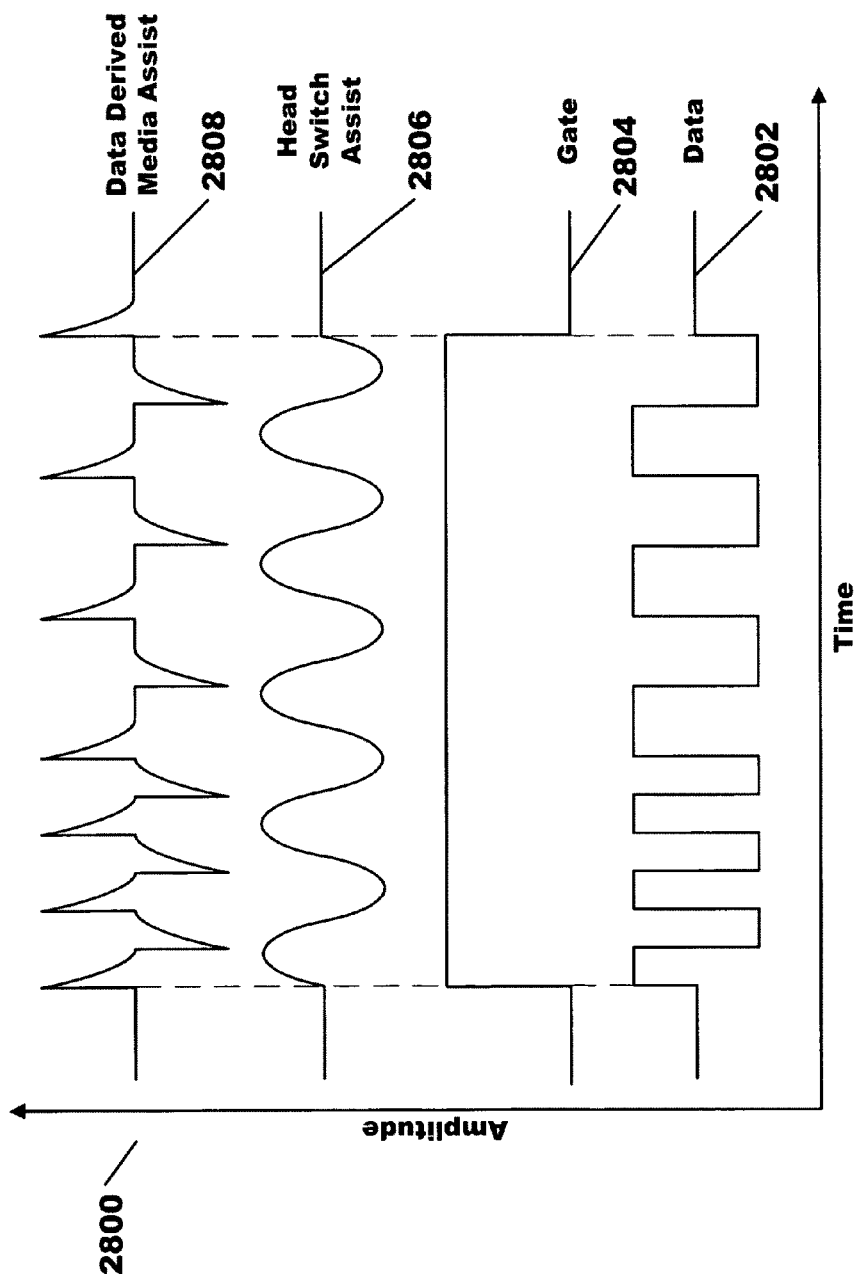
FIG. 28 is a schematic view of a waveform timing diagram of a data derived media write assist waveform, in accordance with an embodiment of the present invention.

FIG. 28 is a schematic view of a waveform timing diagram 2800 of a data derived media write assist waveform, in accordance with an embodiment of the present invention. In this diagram, the media write assist RF sinusoidal waveform 2608 of FIG. 26 has been replaced by a data derived head media writing assist signal 2808. Signal 2808 is used in combination with head switching assist RF sinusoidal waveform 2806. The media write assist current would have the waveform shape of signal waveform 2808, and would flow through the auxiliary half coil in differential mode. The head switching assist current would have the waveform shape of signal waveform 2806, and would flow through the auxiliary half coil in differential mode for the case of asymmetric current feed; or in common mode for the case of symmetric current feed. Waveform 2802 represents a typical digital data signal being written to the media by the perpendicular write head and waveform 2804 represents a "gating" waveform that is "true" or "on" during the presence of data being written, and "off" when no data is present.

Figure 29:
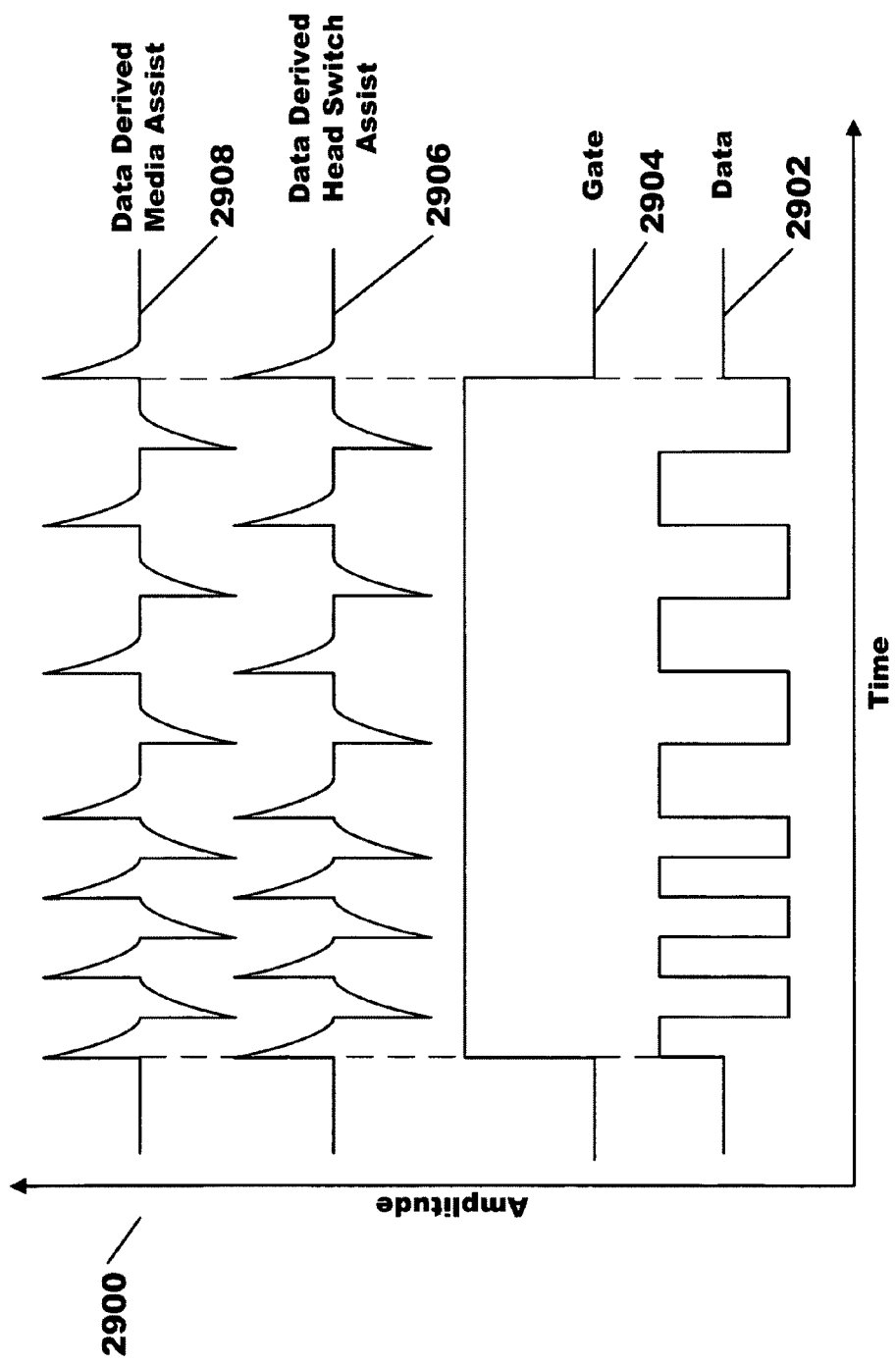
FIG. 29 is a schematic view of a waveform timing diagram of data derived head switching assist and media write assist waveforms, in accordance with an embodiment of the present invention.

FIG. 29 is a schematic view of a waveform timing diagram 2900 of data derived head switching assist and media write assist waveforms, in accordance with an embodiment of the present invention. In this diagram, both media write assist waveform 2908 and head switching assist waveform 2906 are derived from the data signal 2902 being written to the media. The media write assist current would have the waveform shape of signal waveform 2908, and would flow through the auxiliary half coil in differential mode. The head switching assist current would have the waveform shape of signal waveform 2906, and would flow through the auxiliary half coil in common mode for the case of symmetric current feed. For the case of asymmetric current feed, the media write assist current also serves as head switch assist as both waveform shapes are identical, and the current flows in differential mode for both. This is the preferred mode for using data derived signals, as only the differential mode need be utilized, which reduces circuit complexity. Waveform 2902 represents a typical digital data signal being written to the media by the perpendicular write head and waveform 2904 represents a "gating" waveform.

Figure 30:
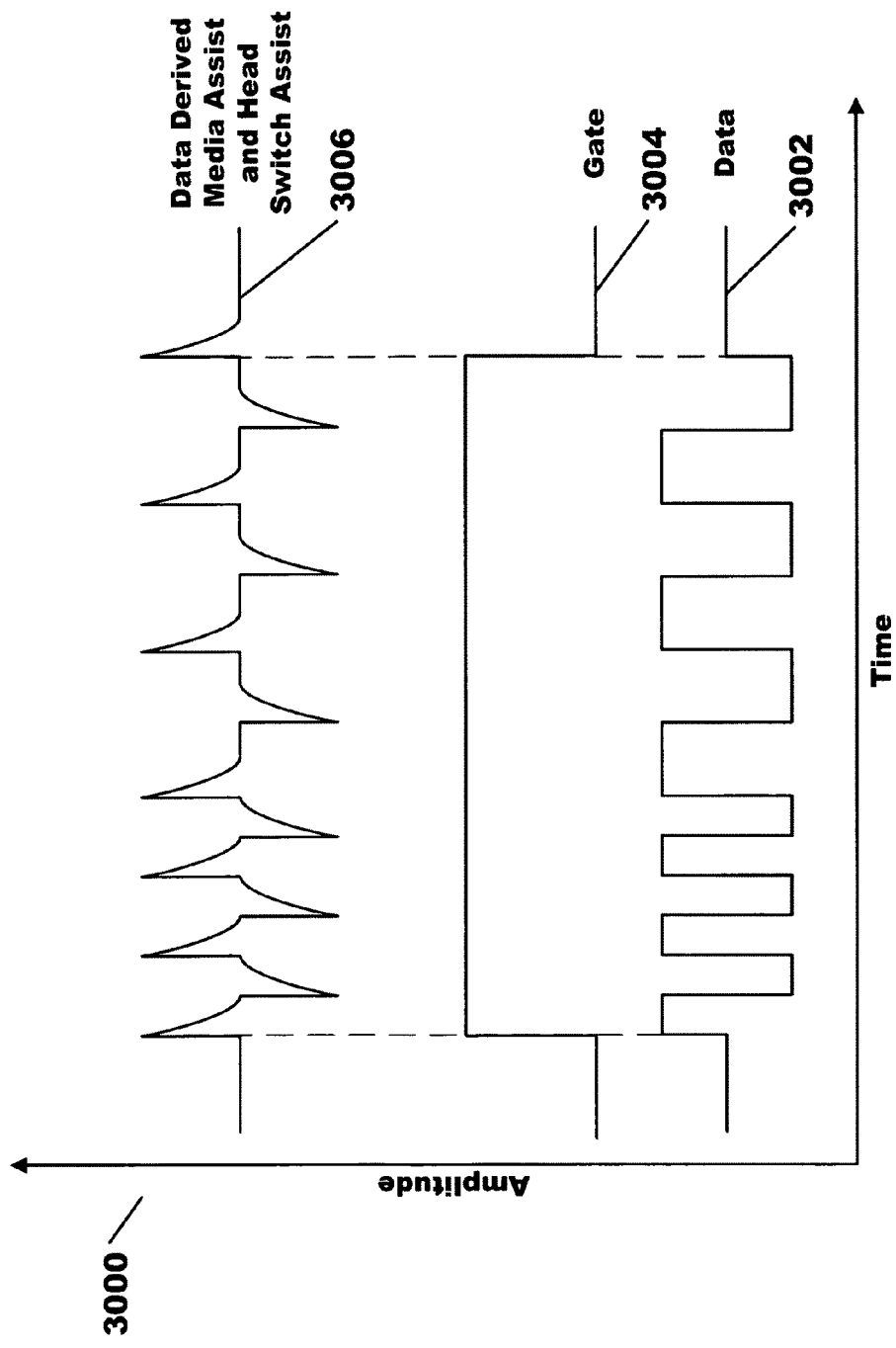
FIG. 30 is a schematic view of a waveform timing diagram of data derived waveform used for both media write assist and head switching assist functions, in accordance with an embodiment of the present invention.

FIG. 30 is a schematic view of a waveform timing diagram 3000 of data derived waveform used for both media write assist and head switching assist functions, in accordance with an embodiment of the present invention. This is the simplified case of FIG. 29, were the same data derived current waveform 3006 is used for both media write assist and head switching assist. Differential current mode is utilized with asymmetric current feed, and the data derived current waveform is operable to provide both media write assist and head switching assist. Waveform 3002 represents a typical digital data signal being written to the media by the perpendicular write head, and is used to generate waveform 3006 as disclosed above. Waveform 3004 represents a "gating" waveform.

The present invention is not limited by the previous embodiments heretofore described. Rather, the scope of the present invention is to be defined by these descriptions taken together with the attached claims and their equivalents.

What is claimed is:

1. A method for writing data signals with a perpendicular head comprising:
   providing a perpendicular head having a pole layer, said pole layer having a flare point, a main coil,
   an auxiliary half coil, extending around three sides of said pole layer at an air bearing surface, said auxiliary half coil having a first terminating end and a second terminating end,
   a first conductive element coupled to said first terminating end of said auxiliary half coil, said first conductive element extending from said air bearing surface, approximately perpendicular to said air bearing surface, to beyond said flare point of said pole layer, and a second conductive element coupled to said second terminating end of said auxiliary half coil, said second conductive element extending from said air bearing surface, approximately perpendicular to said air bearing surface, to beyond said flare point of said pole layer;
   providing a data signal current to said main coil; and
   providing a differential high frequency signal current, said differential high frequency signal current flowing through said first conductive element, through said second conductive element, and through said auxiliary half coil.

2. The method as recited in claim 1, wherein said differential high frequency signal current is an RF sinusoidal waveform.

3. The method as recited in claim 2, wherein said RF sinusoidal waveform has a frequency between 1 and 5 GHz.

4. The method as recited in claim 2, wherein said RF sinusoidal waveform has a frequency between 10 and 50 GHz.

5. The method as recited in claim 2, wherein said RF sinusoidal waveform has a frequency between 40 and 50 GHz.

6. The method as recited in claim 1, wherein said differential high frequency signal current is derived from said data signal current.

7. The method as recited in claim 6, wherein said differential high frequency signal current is obtained by passing a portion of said data signal current through a high pass filter.

8. The method as recited in claim 7, wherein said high pass filter comprises a capacitor coupled to said auxiliary half coil.

9. The method as recited in claim 1,
   wherein said first conductive element is displaced a first distance from said pole layer, said first distance being measured from said pole layer to said first conductive element at the air bearing surface;

wherein said second conductive element is displaced a second distance from said pole layer, said second distance being measured from said pole layer to said second conductive element at the air bearing surface; and wherein said first distance is approximately equal to said second distance.

10. The method as recited in claim 9, further comprising:

providing a first common mode high frequency signal current, said first common mode high frequency signal current flowing through said first conductive element; and providing a second common mode high frequency signal current, said second common mode high frequency signal current flowing though said second conductive element, wherein said first common mode high frequency signal current and said second common mode high frequency signal current have approximately equal magnitude, phase, and frequency.

11. The method as recited in claim 10, wherein said first common mode high frequency signal current and said second common mode high frequency signal current are RF sinusoidal waveforms.

12. The method as recited in claim 11, wherein said RF sinusoidal waveforms have a frequency between 1 and 5 GHz.

13. The method as recited in claim 10, wherein said first common mode high frequency signal current and said second common mode high frequency signal current are derived from said data signal current.

14. The method as recited in claim 13, wherein said first common mode high frequency signal current and said second common mode high frequency signal current are obtained by passing a portion of said data signal current through a high pass filter.

15. The method as recited in claim 14, wherein said high pass filter comprises a first capacitor coupled to said first conductive element and a second capacitor coupled to said second conductive element.

16. The method as recited in claim 1, wherein said first conductive element is displaced a first distance from said pole layer, said first distance being measured from said pole layer to said first conductive element at the air bearing surface;

wherein said second conductive element is displaced a second distance from said pole layer, said second distance being measured from said pole layer to said second conductive element at the air bearing surface; and wherein said first distance is greater than said second distance.

17. The method as recited in claim 16, wherein said differential high frequency signal current is an RF sinusoidal waveform.

18. The method as recited in claim 17, wherein said RF sinusoidal waveform has a frequency between 10 and 50 GHz.

19. The method as recited in claim 17, wherein said RF sinusoidal waveform has a frequency between 40 and 50 GHz.

20. The method as recited in claim 16, wherein said differential high frequency signal current is derived from said data signal current.

21. The method as recited in claim 20, wherein said differential high frequency signal current is obtained by passing a portion of said data signal current through a high pass filter.

22. The method as recited in claim 21, wherein said high pass filter comprises a first capacitor coupled to said first conductive element and a second capacitor coupled to said second conductive element.

* * * * *